(12) United States Patent
Nagano

(10) Patent No.: US 8,891,142 B2
(45) Date of Patent: Nov. 18, 2014

(54) IMAGE READING LENS, IMAGE READER, AND IMAGE-FORMING APPARATUS

(71) Applicant: Takuya Nagano, Yokohama (JP)

(72) Inventor: Takuya Nagano, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/203,835

(22) Filed: Mar. 11, 2014

(65) Prior Publication Data

US 2014/0253983 A1 Sep. 11, 2014

(30) Foreign Application Priority Data

Mar. 11, 2013 (JP) .................................. 2013-048547

(51) Int. Cl.
| | | |
|---|---|---|
| *H04N 1/04* | (2006.01) | |
| *H04N 1/40* | (2006.01) | |
| *H04N 1/193* | (2006.01) | |
| *G02B 13/18* | (2006.01) | |
| *G02B 9/34* | (2006.01) | |
| *H04N 1/028* | (2006.01) | |

(52) U.S. Cl.
CPC *G02B 13/18* (2013.01); *G02B 9/34* (2013.01); *H04N 1/02815* (2013.01)
USPC ............................ 358/475; 358/474; 358/471

(58) Field of Classification Search
CPC .............. H04N 1/02815; H04N 1/193; H04N 1/40056; H04N 1/1013; H04N 1/0287
USPC ............................................................ 358/475
See application file for complete search history.

(56) References Cited

U.S. PATENT DOCUMENTS 4,767,199 A * 8/1988 Yamamoto et al. ........... 359/649
2002/0101665 A1 8/2002 Ohashi et al.

FOREIGN PATENT DOCUMENTS

| JP | 2002-082282 | 3/2002 |
|---|---|---|
| JP | 2007-148047 | 6/2007 |

* cited by examiner

*Primary Examiner* — King Poon
*Assistant Examiner* — Ibrahim Siddo
(74) *Attorney, Agent, or Firm* — Oblon, Spivak, McClelland, Maier & Neustadt, L.L.P.

(57) ABSTRACT

An image reading lens which reads an original image includes a front group lens system on an object side, and a back group lens system on an image side, the front group lens system including three lenses having two positive lenses and a negative lens, and the back group lens system including a plastic negative lens.

13 Claims, 17 Drawing Sheets

IMAGE READING LENS, IMAGE READER, AND IMAGE-FORMING APPARATUS

PRIORITY CLAIM

The present application is based on and claims priority from Japanese Patent Application No. 2013-048547, filed on Mar. 11, 2013, the disclosure of which is hereby incorporated by reference in its entirety.

BACKGROUND

1. Field of the Invention

The present invention relates to an image reader such as an image scanner, and an image reading lens suitable for loading an original image in an image-forming apparatus such as a facsimile machine or a digital copier. The present invention particularly relates to a compact and high-performance image reading lens having the small number of lenses, an image reader using such an image reading lens, and an image-forming apparatus using such an image reader.

2. Description of the Related Art

An image reader in an image scanner, a facsimile, a digital copier, or the like is configured to reduce an image of an original to be read by an image reading lens, image the reduced optical image by an imaging element such as a CCD (charge-coupled device), and change the image information into electric image data. In order to read full-color original information, the imaging element includes a so-called three-line CCD image sensor in which light-receiving elements having red, green, and blue filters are arranged in three lines, and the reduced optical image of the original is formed on the light-receiving surface of the imaging element so as to decompose the reduced optical image into three primary colors, so that the color image information is converted into signals.

The above-described image reading lens is required to have high contrast in a high spatial frequency area on an image surface and aperture efficiency close to 100% in an angular field peripheral portion. Moreover, in order to preferably read a color original, it is necessary to align red, green, and blue imaging positions with the optical axis direction on a light-receiving surface, and the chromatic aberration of each color must be preferably corrected.

A so-called Gaussian image reading lens which is widely used as an image reading lens has a relatively large diameter which achieves a high resolution. However, in order to achieve a recently-required high performance with such a thin configuration, many lenses (i.e., six lenses or more), for example, a four-group configuration having six lenses or a five-group configuration having eight lenses are required.

On the other hand, JP 3939908B discloses an image reading lens made of three to five lenses which are a small number of lenses relative to the Gaussian image reading lens. The image reading lens has a performance which is equal to that of the Gaussian image reading lens or more.

The image reading lens described in JP 3939908B includes three lenses at minimum, and achieves an optical system which can achieve a high performance by easily correcting aberrations with the lens closest to the image side (hereinafter referred to as "the most image side lens") having a negative power near an image surface.

As described above, JP 3939908B discloses the optical system which can achieve a high performance by easily correcting aberrations with the most image side lens having a negative power near an image surface and a small number of lenses such as three to five lenses.

However, JP 3939908B is silent about temperature rise inside the image reader and deterioration in performances associated with the temperature rise due to increase in the amount of heat generation near an imaging portion such as a CCD image sensor associated with downsizing in an image reader and increase in an image reading speed, and also increase in the amount of heat generation associated with increase in luminance of a light source illuminating an original image. JP 3939908B also does not describe the control of the deterioration in performances due to such temperature rise.

Heat expansion and a change in a refractive index of a material of an image reading lens occur due to temperature rise inside the image reader, so that a change in a focal length of an image reading lens occurs. The heat generation near the imaging portion causes heat expansion of a holder which holds the imaging portion such as a CCD image sensor and the image reading lens, deteriorating in a performance due to a gap between the position of the imaging surface and the image-forming position of the image reading lens.

SUMMARY

The present invention has been made in view of the above circumferences, and an object of the present invention is to provide a compact image reading lens which controls deterioration in performance due to a temperature change, has the small number of lenses, and preferably corrects aberrations.

In order to achieve the above object, one embodiment of the present invention provides an image reading lens which reads an original image, including: a front group lens system on an object side; and a back group lens system on an image side, the front group lens system including three lenses having two positive lenses and a negative lens, and the back group lens system including a plastic negative lens, wherein the following conditional expressions are satisfied where $\Sigma dn_N/dt(N)$ is a sum of values $10^6$ times a refractive index temperature coefficient for an e-line in the negative lens of the front group lens system at 20° C. to 40° C., $\Sigma dn_P/dt(P)$ is a sum of values $10^6$ times a refractive index temperature coefficient for an e-line in the positive lens of the front group lens system at 20° C. to 40° C., fa is a focal length of the front group lens system, f is a focal length of an entire image reading lens, $d_9$ is a distance on an optical axis between the front group lens system and the back group lens system, and D is an entire length of a lens, $$0 < \Sigma dn_N/dt(N) - \Sigma dn_P/dt(P) < 17 \quad [1]$$

$$0.20 < fa/f \times d_9/D < 0.90. \quad [2]$$

BRIEF DESCRIPTION OF THE DRAWINGS

The accompanying drawings are included to provide further understanding of the invention and are incorporated in and constitute part of this specification. The drawings illustrate embodiments of the invention and, together with the specification, serve to explain the principle of the invention.

DETAILED DESCRIPTION OF THE PREFERRED EMBODIMENTS

Figure 1:
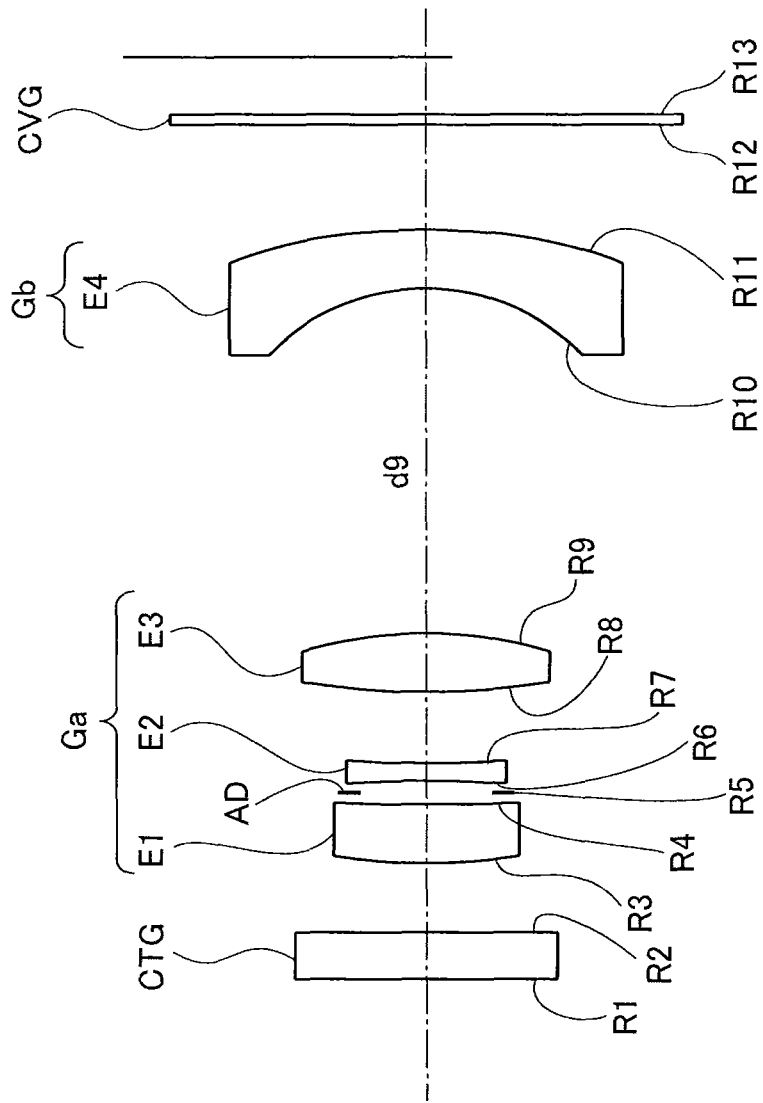
FIG. 1 is a sectional view illustrating the configuration of Example 1 of an image reading lens according to Embodiment 1 of the present invention.

Hereinafter, an image reading lens, image reader, and image-forming apparatus according to the embodiments of the present invention will be described with reference to the drawings. At first, the principle embodiments of the present invention will be described before describing detailed examples.

A known Gaussian image reading lens can achieve a high resolution with a relatively large diameter. However, in order to achieve a recently required high performance, increase in the number of lenses and increase in the size of an optical system due to the increase in the number of lenses are inevitable. For example, JP3939908 discloses an image reading lens which can obtain performances similar to or higher than those in Gaussian image reading lens with the small number of lenses such as three to five lenses compared to the Gaussian image reading lens.

However, JP3939908 is silent about the deterioration in the performances of the image reading lens and the control thereof when there is a rise in temperature inside the image reader due to the increase in the heat generation amount near the imaging portion such as a CCD image sensor and the increase in the heat generation amount associated with the increase in the illumination intensity of the light source for illuminating an image in accordance with the increase in an image reading speed and the downsizing of the image reader.

The heat expansion and a change in the refractive index of the material of the image reading lens occur due to the temperature rise inside the image reader, and thereby, the focal length of the image reading lens is changed. The heat expansion occurs in a holder which holds the imaging portion and the image reading lens due to the heat generation of the imaging portion, and thereby, the relationship between the imaging position of the image reading lens and the position of the imaging surface is deteriorated, resulting in deterioration in performances.

An image reading lens which reads an original image according to Embodiments 1-7 of the present invention includes a front group lens system on an object side and a back group lens system on an image side. The image reading lens includes four lenses as a whole. The front group lens system includes three lenses having two positive lenses and one negative lens. The back group lens system includes one plastic negative lens. A small and high-performance image reading lens which can reliably correct a decrease in image reading accuracy due to a temperature change can be obtained by satisfying the following conditional expressions (1), (2).

$$0 < \Sigma dn_N/dt(N) - \Sigma dn_P/dt(P) < 17 \quad [1]$$

$$0.20 < fa/f \times d_9/D < 0.90 \quad [2]$$

Where, $\Sigma dn_N/dt(N)$ is the sum of values of $10^6$ times a refractive index temperature coefficient for e-line in the negative lens of the front group lens system at 20° C. to 40° C., $\Sigma dn_P/dt(P)$ is the sum of values of $10^6$ times a reflective index temperature coefficient for e-line in the positive lens of the front group lens system at 20° C. to 40° C., fa is a focal length of the front group lens system, f is a focal length of an entire image reading lens, $d_9$ is a distance on an optical axis between the front group lens system and the back group lens system, and D is a lens entire length.

More specifically, the conditional expressions (1), (2) are to specify temperature dependency for the imaging position of the image reading lens. In the conditional expression (1), if $\Sigma dn_N/dt(N) - \Sigma dn_P/dt(P)$ exceeds the upper limit value of the conditional expression (1), it becomes difficult to obtain a preferable imaging performance with the above-described four lenses having the plastic lens in the back group lens system. If $\Sigma dn_N/dt(N) - \Sigma dn_P/dt(P)$ lowers the lower limit value of the conditional expression (1), the decrease in the focal length due to the decrease in a refractive index of the negative plastic lens of the back group lens system when there is a rise in temperature cannot be corrected by the front group lens system. Therefore, it becomes difficult to correct the focal length of the image reading lens by extending the focal length in the temperature rise.

The conditional expression (2) is to optimize an imaging position relative to a temperature change. Regarding the conditional expression (2), the shift in the imaging position in the temperature rise corresponds to the extension of the focal length of the front group lens system, and it is necessary to consider the relationship between the front group lens system and the back group lens system so as to preferably follow a change in the imaging position, and the distance between the front group lens system and the back group lens system is controlled. In the conditional expression (2), if $fa/f \times d_9/D$ exceeds the upper limit value of the conditional expression (2), the imaging position is excessively extended relative to the extension between the image reading lens and the imaging element in the temperature rise. If $fa/f \times d_9/D$ lowers the lower limit value, the imaging position is excessively shortened relative to the extension between the image reading lens and the imaging element in the temperature rise.

As described above, if the parameter is out of the range specified in the conditional expression (2), when there is a rise in temperature inside the image reader, the imaging position in the optical axis direction is significantly shifted relative to the extension of the member which holds, for example, the line CCD image sensor of the imaging element and the image reading lens. For this reason, it becomes difficult to obtain high image quality depending on the usage environment.

More specifically, with the plastic lens provided in the back group lens system and the satisfaction of the conditional expressions (1), (2), the distance from the image reading lens to the imaging position is changed according to temperature, and the change in the imaging position preferably follows the extension of the lens holder due to the temperature, so that a high quality image can be obtained in different temperature environments.

The conditional expression (2) is a conditional expression when a material of a lens barrel and a member forming the interval between the front group lens system and the back group lens system are made of general metal.

On the other hand, when cancelling the influence due to the member in view of the change in the imaging position in more detail by setting the refractive index temperature coefficient of the plastic of the back group lens system to $-1.0 \times 10^{-4}/°C$., it is preferable to satisfy the following conditional expression (2').

$$0.2 \leq (fa/f \times d_9/D)/\alpha \leq 0.4 \quad [2']$$

Where $\alpha$ is a value of $10^5$ times a linear expansion coefficient of the member forming the interval between the front group lens system and the back group lens system.

The image reading lens can be further downsized by satisfying the following conditional expression (3).

$$0.40 < d_9/D < 0.70 \quad [3]$$

Where $d_9$ is the distance on the optical axis between the front group lens system and the back group lens system, and D is the lens entire length.

The conditional expression (3) is to specify the distance on the optical axis between the front group lens system and the back group lens system relative to the entire length of the image reading lens.

If $d_9/D$ exceeds the upper limit value of the conditional expression (3), the entire length of the image reading lens is increased, and thereby, the size in the image reading lens is increased. If $d_9/D$ lowers the lower limit value of the conditional expression (3), the size in the front group lens system is increased, and thereby, the size in the image reading lens is increased, resulting in an increase in costs.

The image reading lens preferably corrects chromatic aberration by satisfying the following conditional expression (4).

$$10 < \nu P - \nu N < 40 \quad [4]$$

Where $\nu_p$ is the average value of the Abbe's number for the e-line in the positive lens constituting the entire system of the image reading lens, and $\nu_n$ is the average value of the Abbe's number for the e-line in the negative lens constituting the entire system of the image reading lens.

The conditional expression (4) is to specify the dispersion of the Abbe's number of the image reading lens. The chromatic aberration of magnification due to the g-line and the C-line with the above-described image reading lens can be preferably corrected by setting $\nu_p - \nu_n$ within the range of the conditional expression (4).

Moreover, a third lens arranged from the object side in the front group lens system includes the positive lens having a convex surface on the image side. A fourth lens arranged from the object side includes the negative lens having a concave surface on the object side. With this configuration, monochromatic aberration can be easily corrected.

Furthermore, the image reading lens can further reliably correct the monochromatic aberration by satisfying the following conditional expression (5).

$$1.0 < R_9/R_{10} < 2.5 \quad [5]$$

Where $R_9$ is a curvature radius of an image side lens surface of the third lens, and $R_{10}$ is a curvature radius of an object side lens surface of the fourth lens.

The conditional expression (5) is to specify a ratio of the curvature of the image side lens surface of the third lens and a curvature of the object side lens surface of the fourth lens. If $R_9/R_{10}$ exceeds the upper limit value of the conditional expression (5), the distortion is excessively corrected on the object side lens surface of the fourth lens, so that it becomes difficult to achieve preferable aberration correction. On the other hand, if $R_9/R_{10}$ lowers the lower limit value of the conditional expression (5), the size of the front group lens system is increased for correcting the distortion.

The third lens in the front group lens system is the positive lens, and can reliably correct the aberration by satisfying the following conditional expression (6).

$$-1.30 < (R_9 + R_8)/(R_9 - R_8) < -0.20 \quad [6]$$

Where $R_8$ is a curvature radius of an object side lens surface of the third lens, and $R_9$ is a curvature radius of an image side lens surface of the third lens.

The conditional expression (6) is to specify the shape of the positive third lens. Namely, if $(R_9 + R_8)/(R_9 - R_8)$ exceeds the upper limit value of the conditional expression (6), the curvature of the object side lens surface of the third lens becomes strong, so that it becomes difficult to reliably correct the aberration due to the first and second lenses.

If $(R_9 + R_8)/(R_9 - R_8)$ lowers the lower limit value of the conditional expression (6), the curvature of the lens surface of the object side of the third lens becomes weak, and thereby, the spherical aberration occurs. As described above, by setting $(R_9 + R_8)/(R_9 - R_8)$ within the range of the conditional expression (6), the positive power can be appropriately obtained without excessively increasing the curvature of the third lens, so that the aberration can be preferably corrected.

The deterioration in the image reading accuracy associated with a change in temperature can be preferably corrected by satisfying the following conditional expression (7).

$$-1.3 < fa/fb < -0.8 \quad [7]$$

Where fa is a focal length of the front group lens system, and fb is a focal length of the back group lens system.

The conditional expression (7) is to specify a ratio between the focal length of the front group lens system and the focal length of the back group lens system in the image reading lens.

The aberration can be corrected with a good balance by setting fa/fb within the range of the conditional expression (7). When the plastic lens is disposed in the back group lens system, the distance to the imaging position of the image reading lens is changed according to the temperature. Therefore, the plastic lens can preferably follow the extension of the lens holder due to a temperature, and thereby, a high image quality can be obtained in different temperature environments.

It is preferable for at least one surface of the fourth lens constituting the back group lens system to be an aspheric surface.

With this configuration, the distortion of the image can be effectively corrected.

It is preferable for at least one surface of the first to third lenses constituting the front group lens system to be an aspheric surface. With this configuration, the aberration can be more preferably corrected.

The outer shape of the fourth lens constituting the back group lens system to be a shape which is not rotationally symmetric relative to the optical axis because the light-receiving element constituting the imaging element is disposed on the image surface. It is preferable for the outer shape to be, for example, a strip shape having a side in the main scanning direction longer than that in the sub-scanning direction.

When a high quality image is obtained with the above-described configuration of the image reading lens, the diameter of the back group lens system may be increased. However, when a light-receiving element array is used as the imaging element, it is only necessary to ensure a measurement which allows the passage of a light beam only in the single direction corresponding to the main-scanning direction which is the arrangement direction of the light-receiving element. For this reason, the measurement can be reduced as the imaging reading lens compared to the lens diameter regarding the direction orthogonal to the arrangement direction of the light-receiving element, so that the entire size can be reduced.

It is also possible for the outer shape of the fourth lens constituting the back group lens system to be rotationally symmetric relative to the optical axis. In this case, the entire screen of the image can be simultaneously read by using the area sensor as the imaging element.

Moreover, an image reader according to Embodiments 8, 9 includes an illumination system which illuminates an original, an imaging lens which reduces and images reflection light of the original illuminated by the illumination system, and a line sensor which photoelectrically converts an image of the original imaged by the imaging lens. In the image reader according to Embodiments 8, 9, the imaging lens uses the above-described image reading lens. With this configuration, a compact and high-performance image reader which can effectively correct decrease in image reading accuracy associated with a temperature change can be obtained.

An image-forming apparatus according to Embodiment 10 includes an image reader which reads an original image and obtains image data and an image output device which forms a two-dimensional image based on the image data on an output medium such as paper. The image reader is the above-described image reader including the above-described image reading lens as an imaging lens. With this configuration, a compact and high-performance image-forming apparatus which can effectively correct decrease in image reading accuracy associated with a temperature change can be obtained.

Example 1

Figure 2:
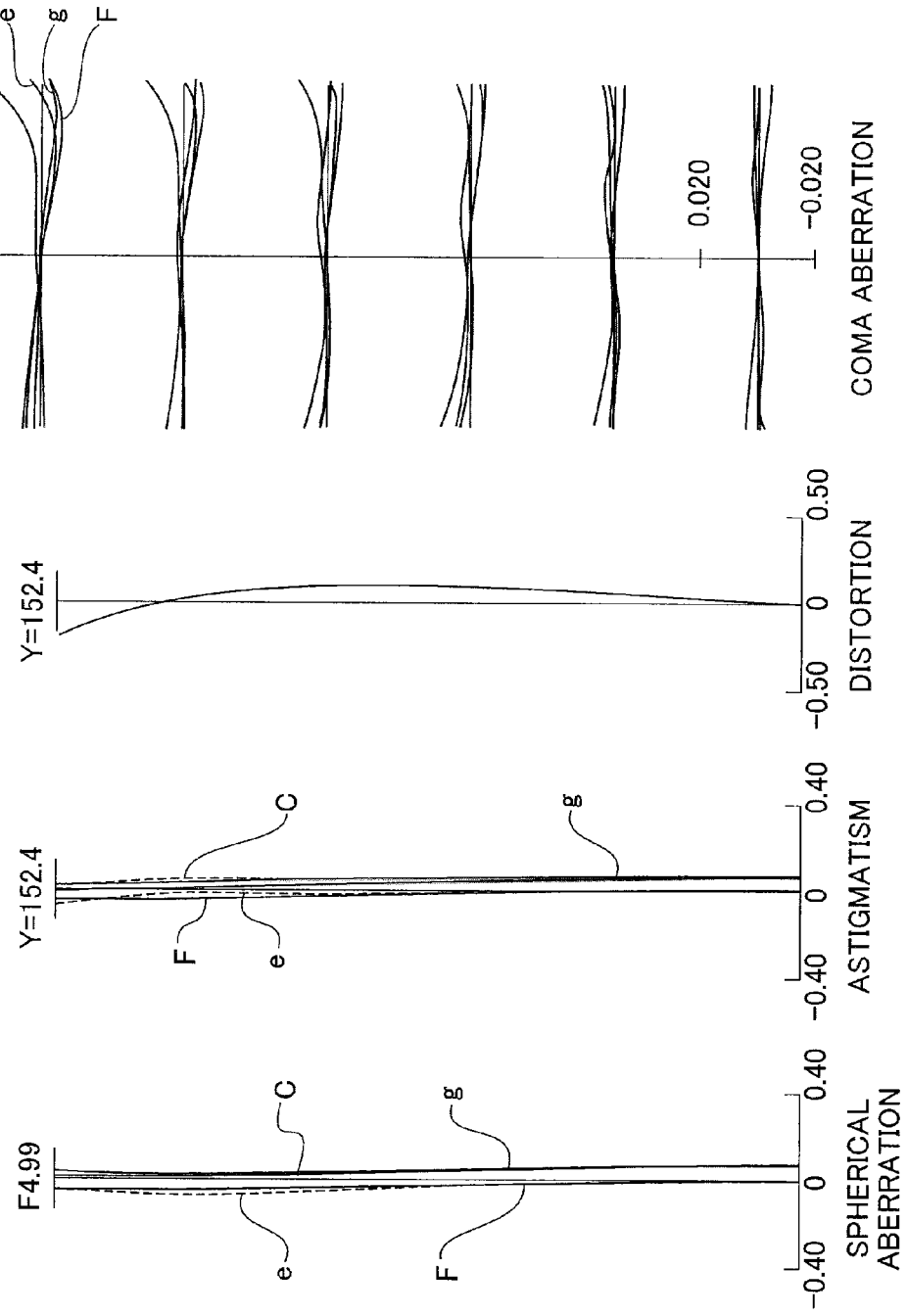
FIG. 2 is an aberration view illustrating spherical aberration, astigmatism, distortion, and coma aberration of the image reading lens of Example 1 in FIG. 1.
Figure 3:
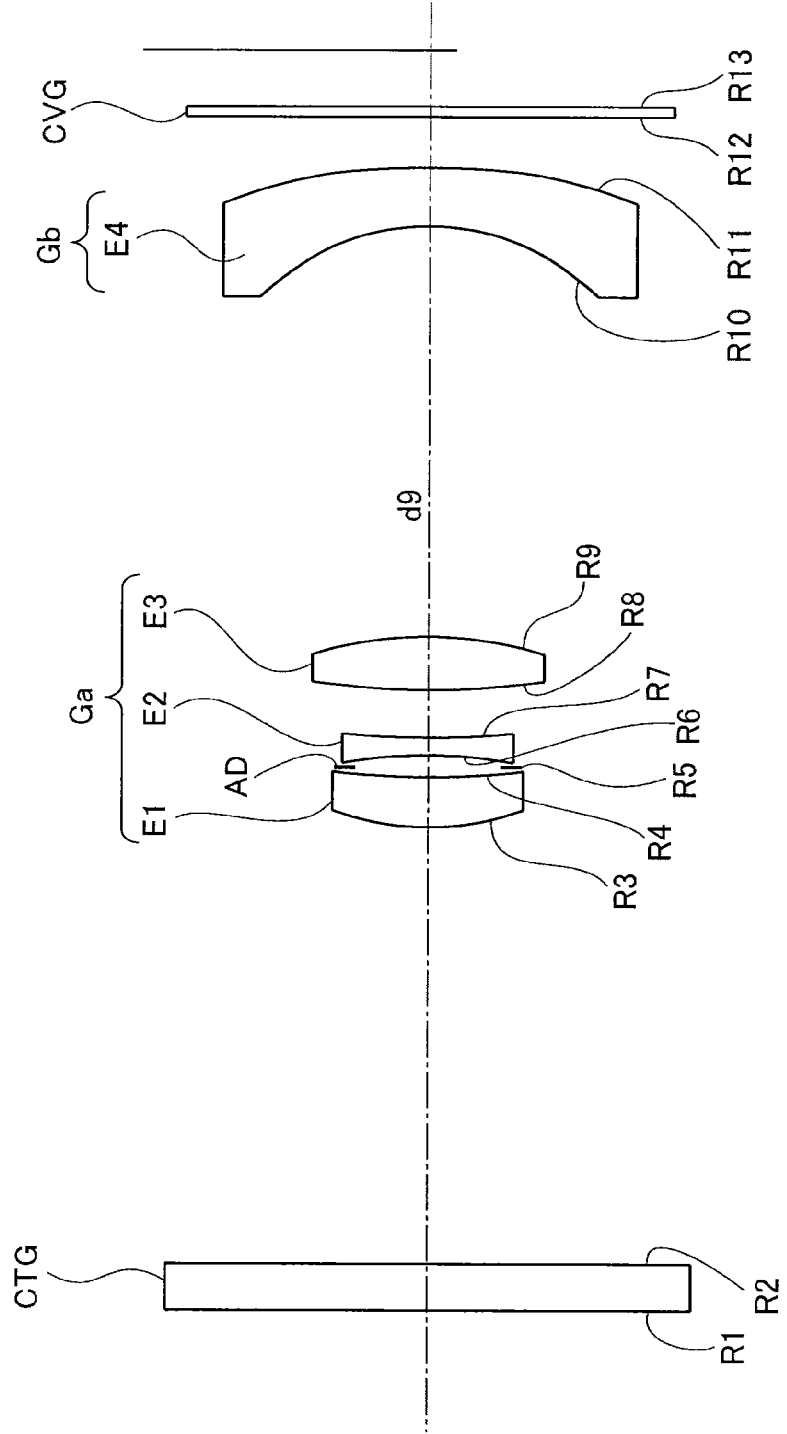
FIG. 3 is a sectional view illustrating the configuration of Example 2 of an image reading lens according to Embodiment 2 of the present invention.
Figure 4:
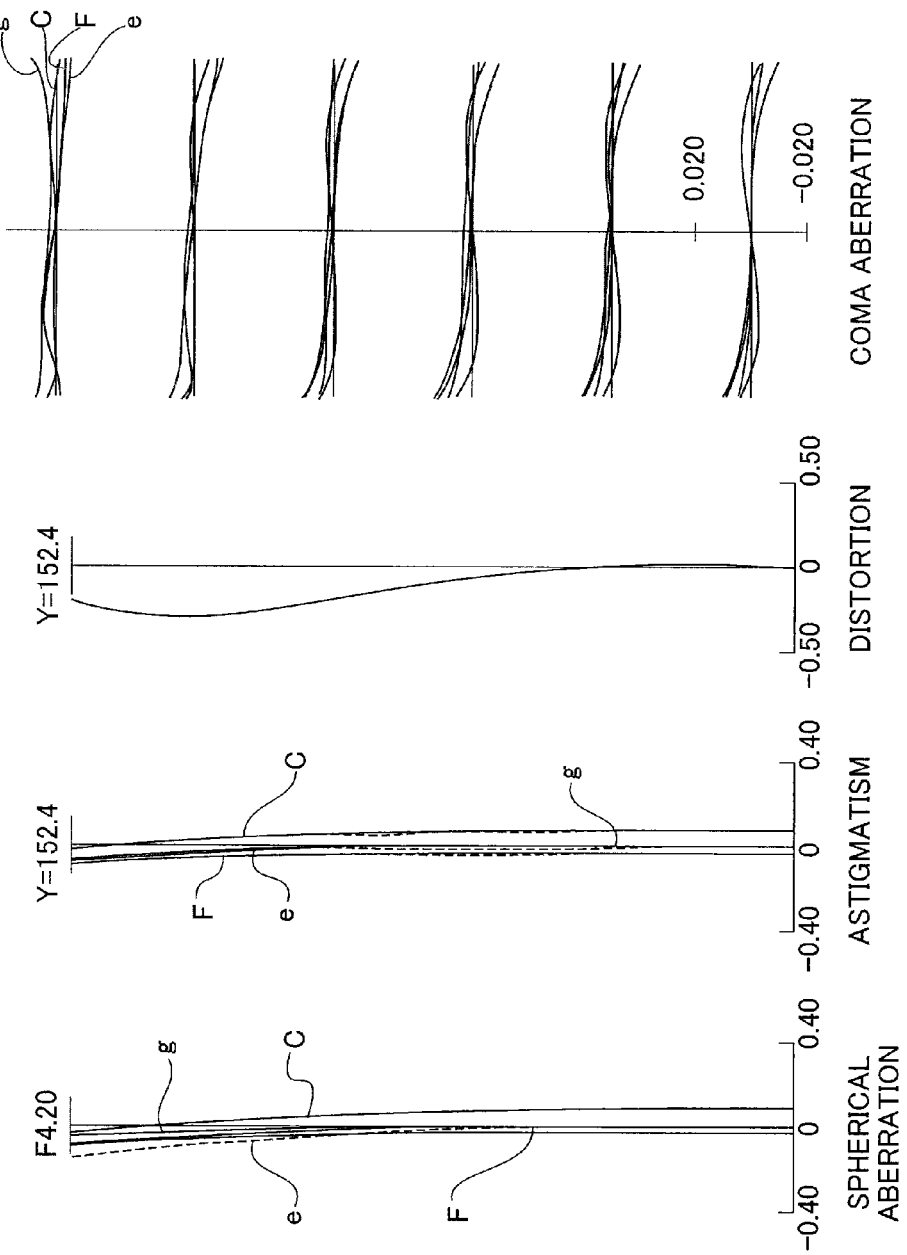
FIG. 4 is an aberration view illustrating spherical aberration, astigmatism, distortion, and coma aberration of the image reading lens of Example 2 in FIG. 3.
Figure 5:
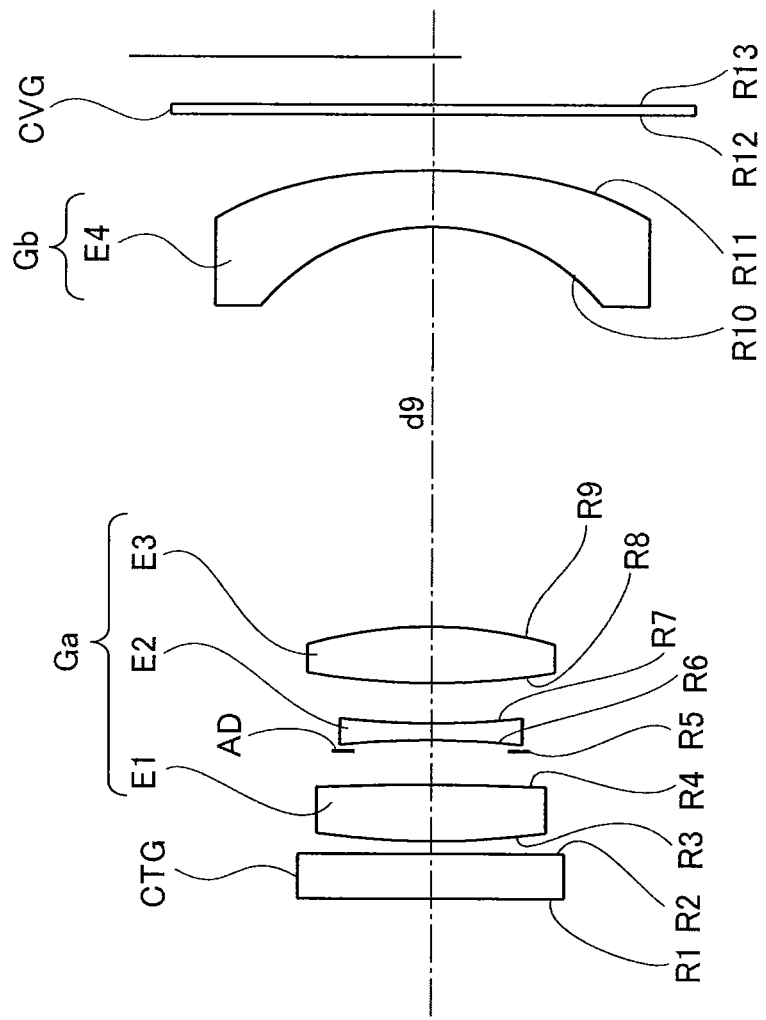
FIG. 5 is a sectional view illustrating a configuration of Example 3 of an image reading lens according to Embodiment 3 of the present invention.
Figure 6:
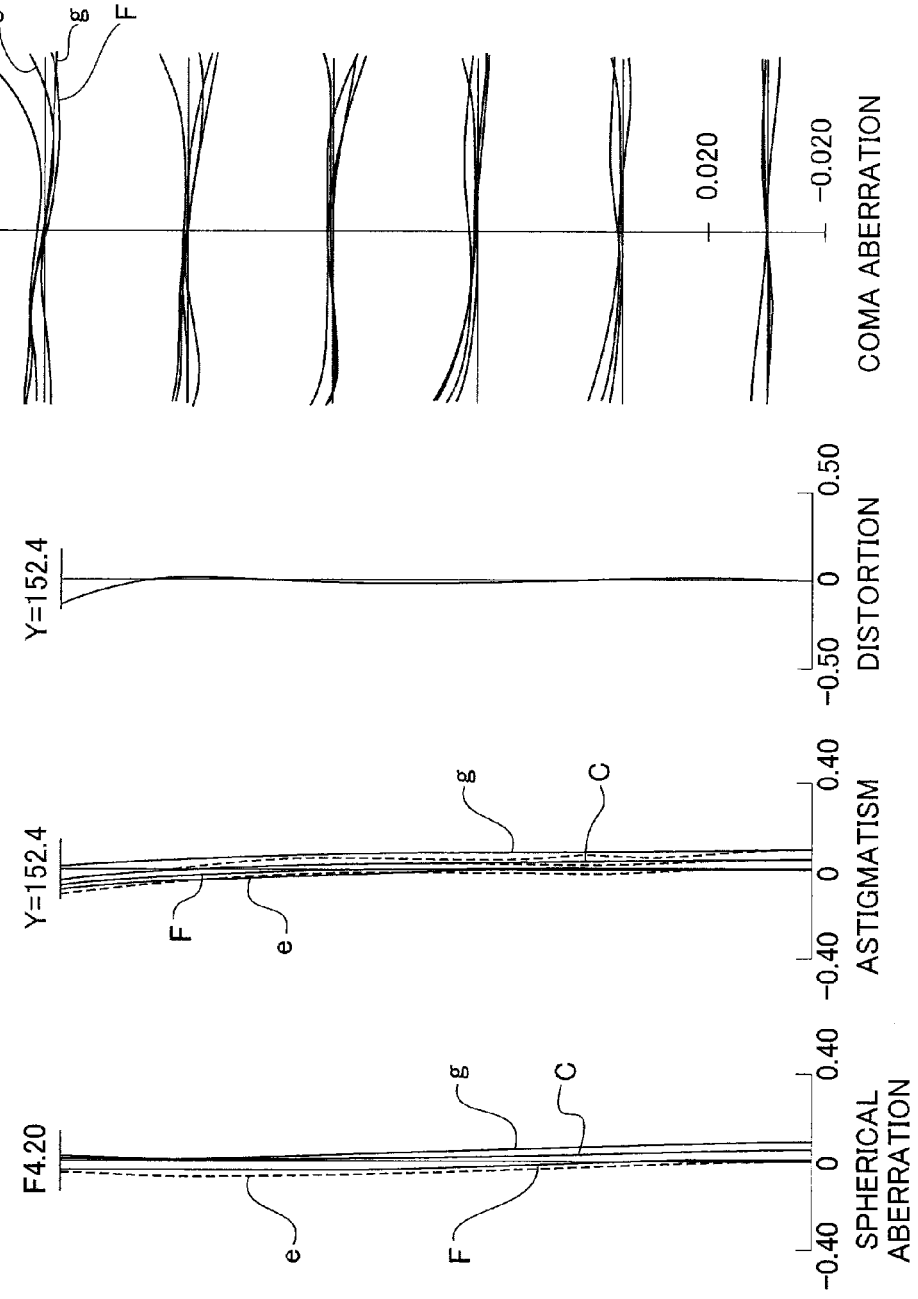
FIG. 6 is an aberration view illustrating spherical aberration, astigmatism, distortion, and coma aberration of the image reading lens of Example 3 in FIG. 5.
Figure 7:
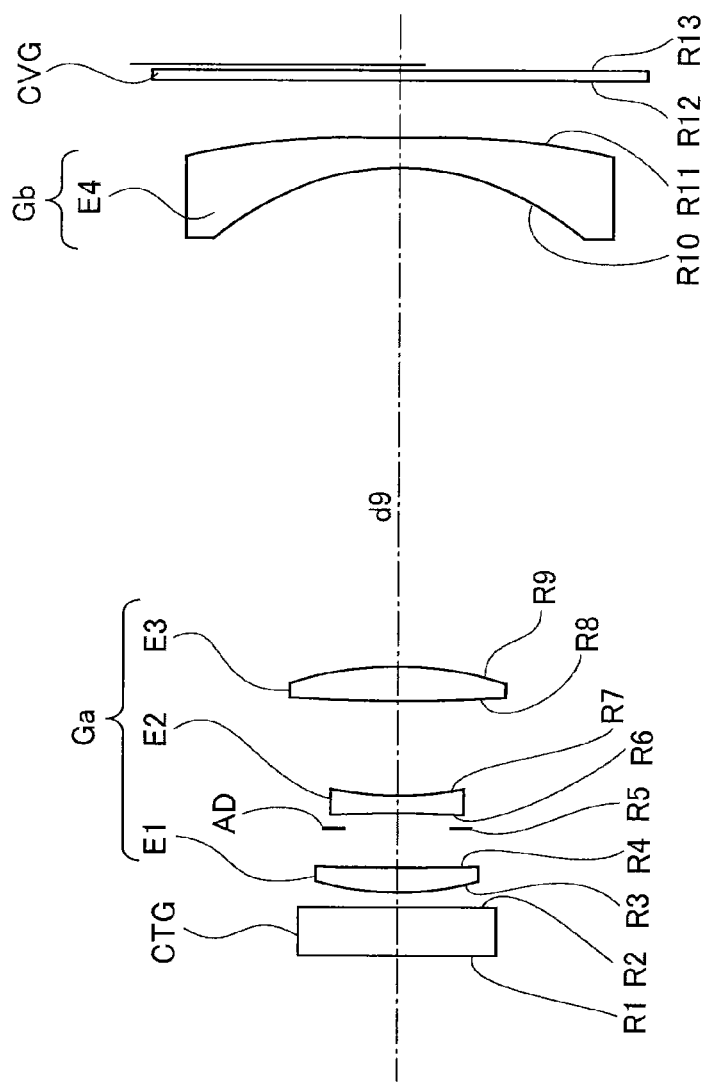
FIG. 7 is a sectional view illustrating a configuration of Example 4 of an image reading lens according to Embodiment 4 of the present invention.
Figure 8:
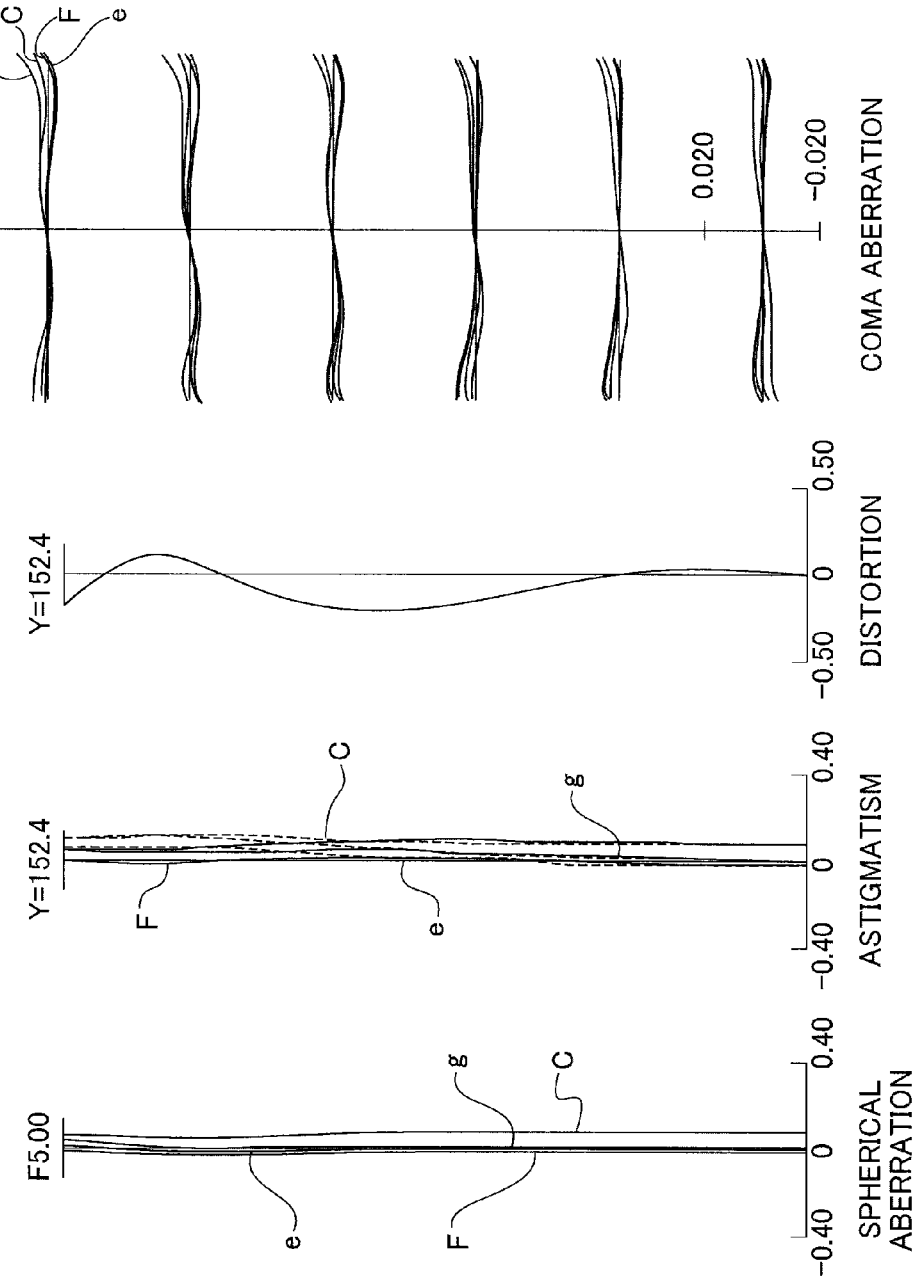
FIG. 8 is an aberration view illustrating spherical aberration, astigmatism, distortion, and coma aberration of the image reading lens of Example 4 in FIG. 7.
Figure 9:
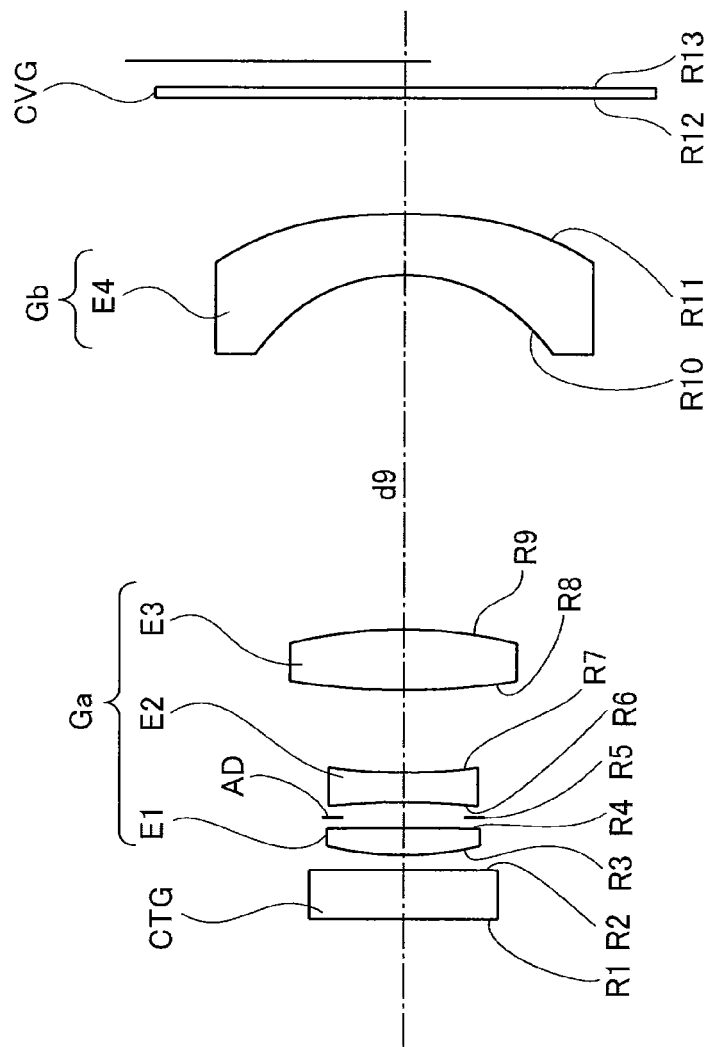
FIG. 9 is a sectional view illustrating a configuration of Example 5 of an image reading lens according to Embodiment 5 of the present invention.
Figure 10:
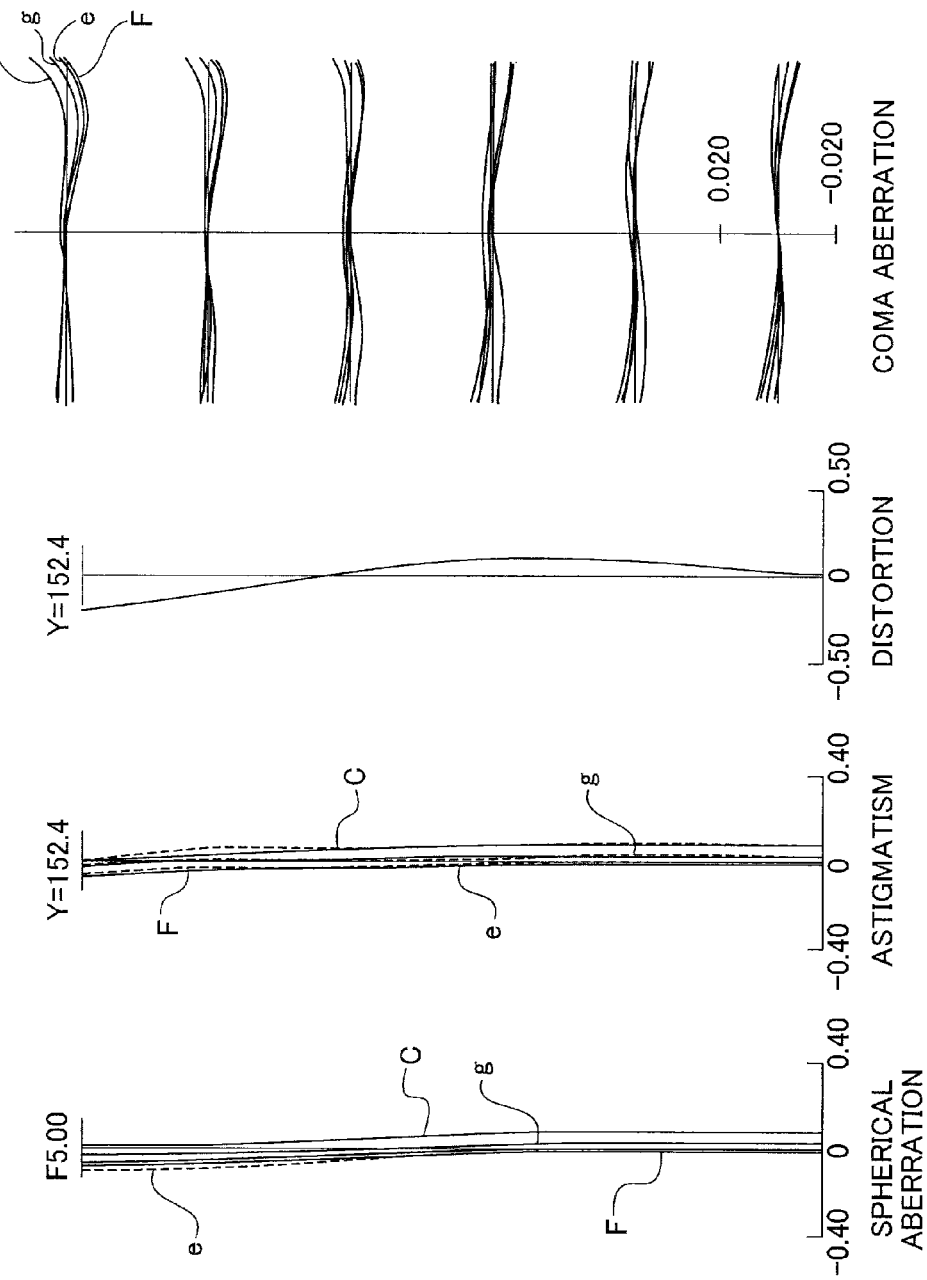
FIG. 10 is an aberration view illustrating spherical aberration, astigmatism, distortion, and coma aberration of the image reading lens of Example 5 in FIG. 9.
Figure 11:
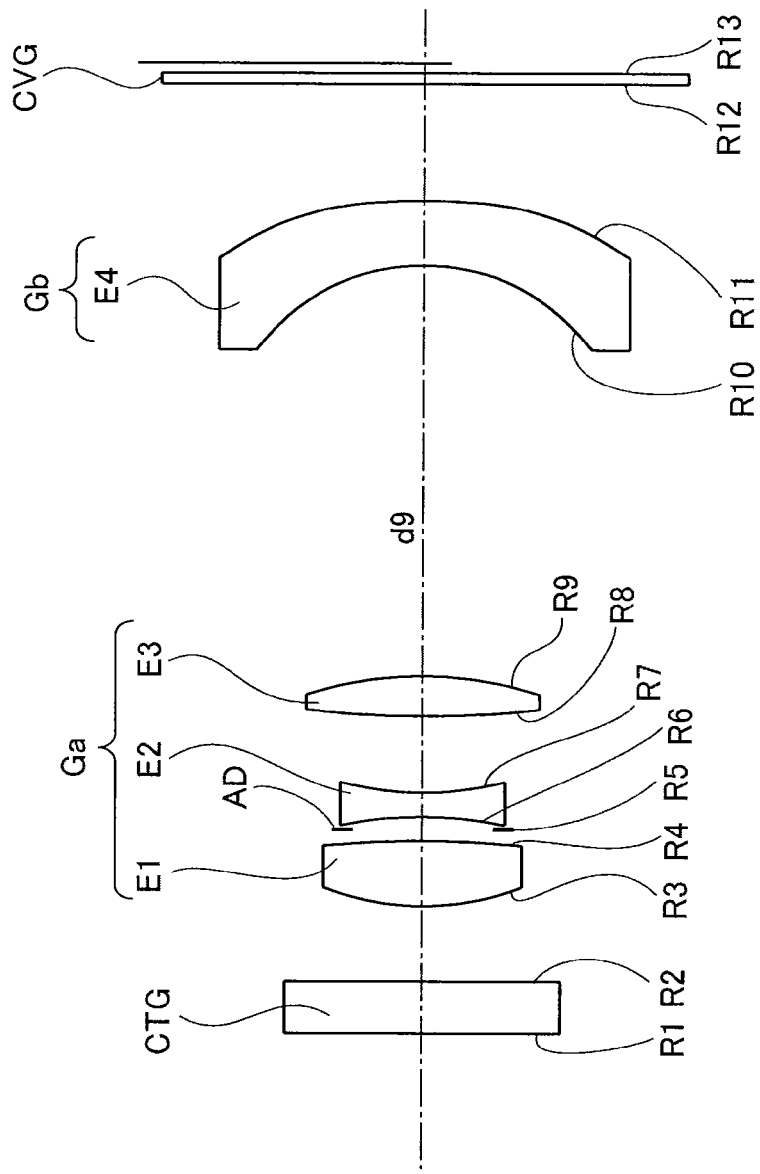
FIG. 11 is a sectional view illustrating a configuration of Example 6 of an image reading lens according to Embodiment 6 of the present invention.
Figure 12:
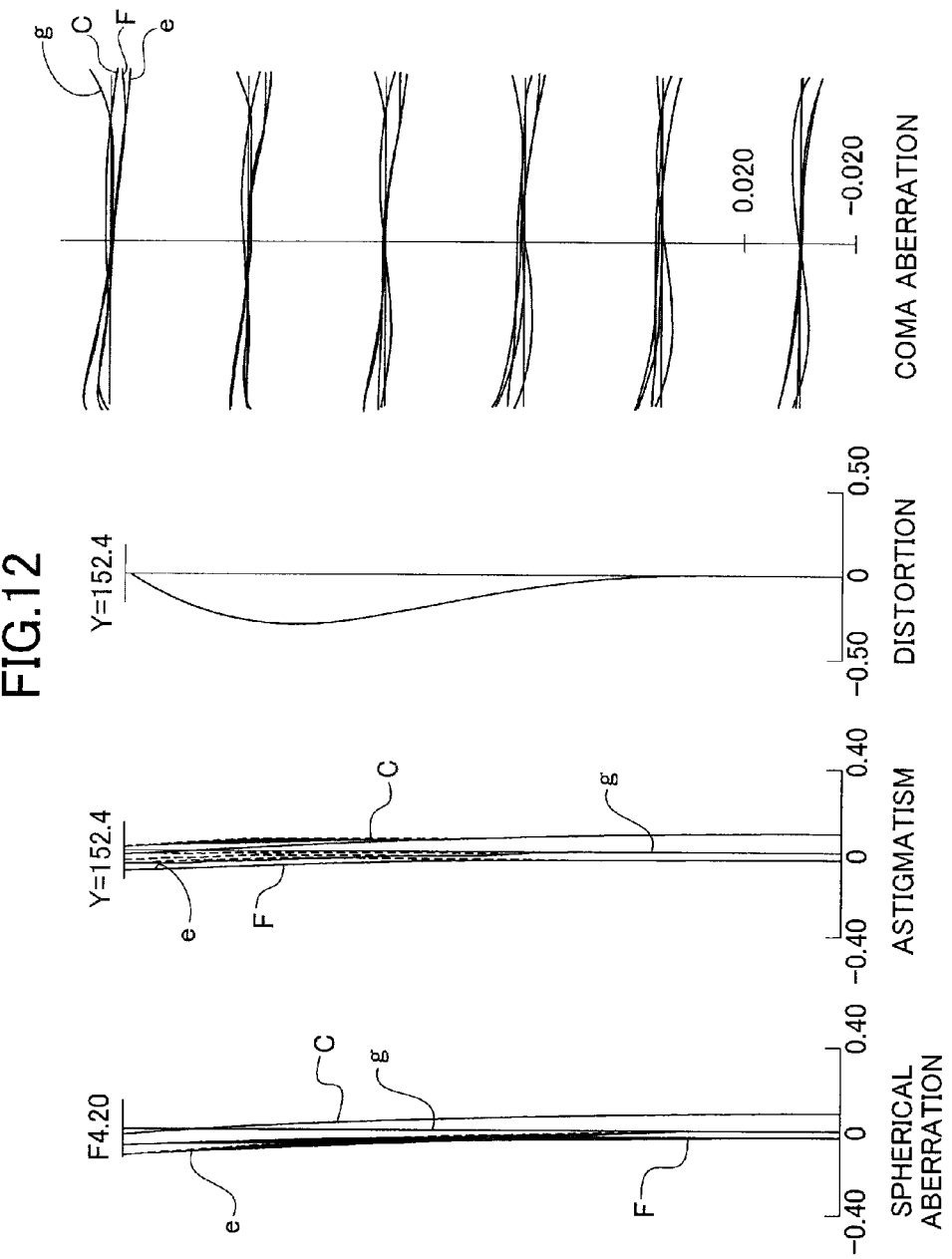
FIG. 12 is an aberration view illustrating spherical aberration, astigmatism, distortion, and coma aberration of the image reading lens of Example 6 in FIG. 11.
Figure 13:
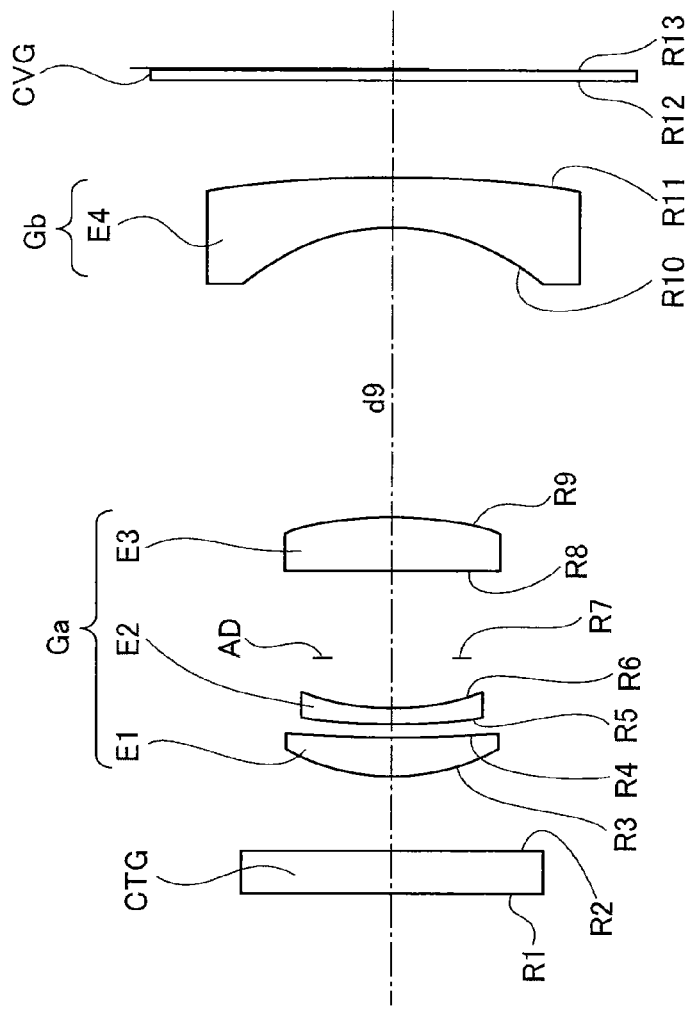
FIG. 13 is a sectional view illustrating a configuration of Example 7 of an image reading lens according to Embodiment 7 of the present invention.
Figure 14:
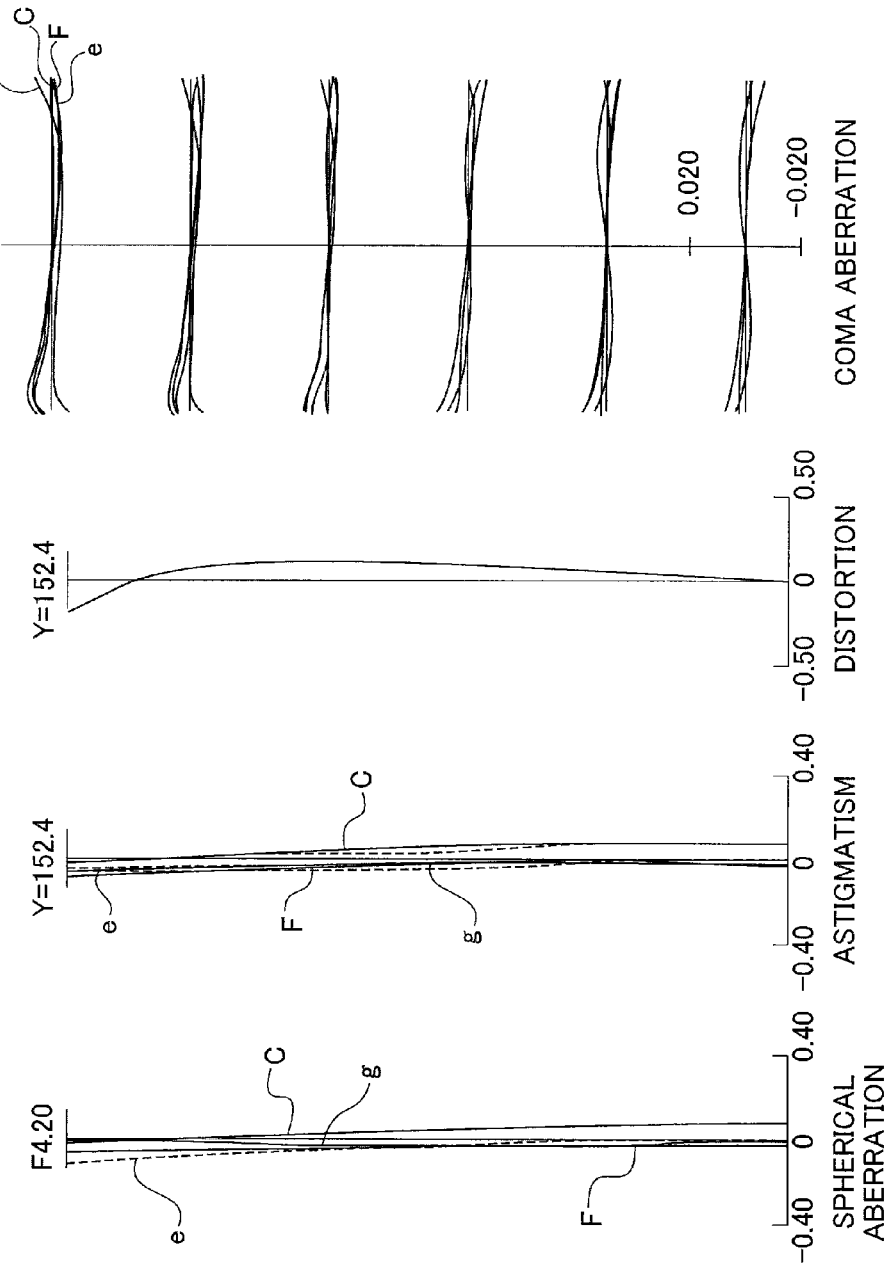
FIG. 14 is an aberration view illustrating spherical aberration, astigmatism, distortion, and coma aberration of the image reading lens of Example 7 in FIG. 13.

Specific examples based on the above-described embodiments of the present invention will be described in detail. Examples 1-7 are specific examples with numerical examples of the image reading lenses according to Embodiments 1-7 of the present invention. FIGS. 1, 2 are views describing an image reading lens in Example 1 according to Embodiment 1 of the present invention. FIGS. 3, 4 are views describing an image reading lens in Example 2 according to Embodiment 2 of the present invention. FIGS. 5, 6 are views describing an image reading lens in Example 3 according to Embodiment 3 of the present invention. FIGS. 7, 8 are views describing an image reading lens in Example 4 according to Embodiment 4 of the present invention. FIGS. 9, 10 are views describing an image reading lens in Example 5 according to Embodiment 5 of the present invention. FIGS. 11, 12 are views describing an image reading lens in Example 6 according to Embodiment 6 of the present invention. FIGS. 13, 14 are views describing an image reading lens in Example 7 according to Embodiment 7 of the present invention.

The aberrations in Examples 1-7 are sufficiently corrected. Namely, it is apparent from Examples 1-7 that preferable image performances can be obtained with the configurations of the image reading lenses in Embodiments 1-7 of the present invention.

The meanings of reference marks common to Examples 1-7 are as follows.

f: focal length for e-line in entire image reading lens
F: F value (F number)
R: curvature radius
d: surface distance
ne: refractive index for e-line
ve: Abbe's number for e-line
K: conical constant of aspheric surface
$A_4$: fourth-order aspheric surface coefficient
$A_6$: sixth-order aspheric surface coefficient
$A_8$: eighth-order aspheric surface coefficient
$A_{10}$: tenth-order aspheric surface coefficient The aspheric surface shape used herein is defined by the following formula (8) where C is an inverse (paraxial curvature) of a paraxial curvature radius, H is a height from an optical axis, K is a conical constant, and X is the aspheric surface amount in the optical axis direction by using the above-described aspheric surface coefficients, and the shape is specified by giving a paraxial curvature radius, conical constant, and aspheric surface coefficient.

$$X = \frac{CH^2}{1+\sqrt{1-(1+K)C^2H^2}} + A_4 \cdot H^4 + A_6 \cdot H^6 + A_8 \cdot H^8 + A_{10} \cdot H_{10} \quad (8)$$

FIG. 1 illustrates a schematic configuration of a longitudinal plane of an optical system of an image reading lens in Example 1 according to Embodiment 1 of the present invention.

The image reading lens illustrated in FIG. 1 includes a first lens E1, a second lens E2, a third lens E3, an aperture AD, a contact glass CTG, and a cover glass CVG.

In FIG. 1, an optical system of the image reading lens includes, in order from an image original side such as a subject, namely, an object side to an image side, the contact glass CTG, the first lens E1, the aperture AD, the second lens E2, the third lens E3, the fourth lens E4 and the cover glass CVG.

The contact glass CTG is a glass made of a parallel plate having a surface on which the image original is closely placed.

The first lens E1 is a positive meniscus lens including on the object side, a surface (namely, surface having small curvature radius) having a curvature larger than that on the image side and a convex surface, and forms an aspheric surface on the object side. The aperture AD is disposed between the first lens E1 and the second lens E2. The second lens E2 is a negative lens made of a biconcave lens including, on the image side, a surface having a curvature slightly larger than that on the object side. The third lens E3 is a positive lens made of a biconvex lens including on the image side a surface having a curvature larger than that on the object side. The first lens E1, the aperture AD, the second lens E2, and third lens E3 constitute the front group lens system Ga.

The fourth lens E4 is a negative meniscus lens including, on the object side, a surface having a curvature larger than an image side, and including, on the image side, a convex surface, forms an aspheric surface on both of the object side and the image side, and singly constitutes the back group lens system Gb.

The cover glass CVG is a sealing glass made of a parallel plate for protecting an imaging surface of an imaging element such as a CCD (Charge-Coupled Device) image sensor or CMOS (Complementary Metal-Oxide Semiconductor) image sensor which obtains image data by imaging an optical image of an original image by the image reading lens. The cover glass CVG includes various optical filters such as an optical low-pass filter or an infrared cut filter, or a dummy glass instead of the filters.

lens E4. The optical image of the image original which is an imaging target closely placed on the contact glass CTG is imaged behind the cover glass CVG.

FIG. 1 illustrates the surface numbers of the respective optical surfaces. In addition, the reference numbers in FIG. 1 are common to the corresponding portions in Examples 1-7 according to Embodiments 1-7 in order to avoid the complicating the description due to an increase in a digit number of a reference number. For this reason, even if the same reference numbers are used in FIGS. 3, 5, 7, 9, 11, and 13, the configurations are not always the same as the configurations in Examples 2-7 according to Embodiment 2-7.

In Example 1, the F value (F number) F=4.99 and the object height Y=152.4, and the optical properties of the optical elements are shown in Table 1 below. In addition, in Table 1 below, CTn denotes a refractive index temperature coefficient ($10^{-6}/°$ C.), CLE denotes a linear expansion coefficient ($10^{-7}/°$ C.), AL denotes aluminum, FE denotes an iron, CTG denotes the contact glass, AD denotes the aperture, CVG denotes the cover glass, Ga denotes the front group, Gb denotes the back group, E1 denotes the first lens, E2 denotes the second lens, E3 denotes the third lens, E4 denotes the fourth lens, and BF denotes back focusing.

TABLE 1

OPTICAL PROPERTY

| SURFACE NUMBER | R | d | ne | ve | CTn | CLE | REMARK | |
|---|---|---|---|---|---|---|---|---|
| 1 | ∞ | 3.20 | 1.51825 | 63.93 | | | CTG | |
| 2 | ∞ | 4.73 | | | | | | |
| 3* | 31.192 | 4.00 | 1.59732 | 67.37 | −5.9 | 117 | E1 | Ga |
| 4 | 137.550 | 0.81 | | | | 236(AL) | | |
| 5 | ∞ | 0.80 | | | | 236(AL) | AD | |
| 6 | −63.187 | 1.20 | 1.72310 | 29.28 | 4.8 | 82 | E2 | |
| 7 | 59.172 | 4.91 | | | | 236(AL) | | |
| 8 | 41.945 | 4.00 | 1.59522 | 67.37 | −5.9 | 117 | E3 | |
| 9 | −23.366 | 23.50 | | | | 170(FE) | | |
| 10* | −12.489 | 4.00 | 1.53342 | 56.15 | −100 | 600 | E4 | Gb |
| 11* | −43.310 | 7.21 | | | | | | |
| 12 | ∞ | 0.70 | 1.51825 | 63.93 | | | CVG | |
| 13 | ∞ | BF | | | | | | |

In Table 1, the lens surface having a surface number marked with an asterisk "*" is an aspheric surface. Namely, in Table 1, the third, tenth and eleventh optical surfaces marked with an asterisk "*" are aspheric surfaces, respectively, and the parameters of the aspheric surfaces in the formula (8) are shown in Table 2 below. In addition, in the aspheric surface coefficient, "En" denotes ×10$^n$. For example, E−05 denotes ×10$^{-5}$. These are the same as in other examples.

TABLE 2

ASPHERIC SURFACE PARAMETER

| SURFACE NUMBER | K | $A_4$ | $A_6$ | $A_8$ | $A_{10}$ |
|---|---|---|---|---|---|
| 3 | 0 | −2.54596E−05 | −1.15857E−07 | −2.67363E−10 | −6.67639E−12 |
| 10 | 0 | −3.56239E−05 | 3.74105E−07 | −1.62994E−09 | 1.13540E−11 |
| 11 | 0 | −4.47590E−05 | 2.07821E−07 | −7.48719E−10 | 9.81096E−13 |

More specifically, the image reading lens body includes the front group lens system Ga having the first to third lenses E1-E3 and the back group lens system Gb having the fourth In this case, the values corresponding to the conditional expressions (1)-(7) are shown in Table 3 below, and satisfy the conditional expressions (1)-(7).

TABLE 3

VALUE OF CONDITIONAL EXPRESSION

| CONDITIONAL EXPRESSION | VARIABLE NUMBER | VALUE |
|---|---|---|
| (1) | $\Sigma dn_N/dt\ (N) - \Sigma dn_P/dt\ (P)$ | 16.6 |
| (2) | $fa/f \times d_9/D$ | 0.41 |
| (2') | $(fa/f \times d_9/D)/\alpha$ | 0.24 |
| (3) | $d_9/D$ | 0.54 |
| (4) | $\nu_P - \nu_N$ | 24.66 |
| (5) | $R_9/R_{10}$ | 1.87 |
| (6) | $(R_9 + R_8)/(R_9 - R_8)$ | −0.28 |
| (7) | $fa/fb$ | −0.94 |

Variation in Imaging Position

It is necessary to control the gap between the imaging position and the imaging surface to about ±10 μm, in order to preferably maintain image reading accuracy. When a metal material or a plastic material is used between the final lens and the CCD, the positional relationship between the imaging position and the imaging surface (CCD) can be preferably maintained after a temperature rise as long as variation in an imaging position due to the temperature rise is within the range of −1 to 16 μm in view of the individual difference of the member.

The variation in an imaging position associated with a change in temperature from 20° C. to 40° C. in Example 1 is as follows. It can be known from the following that the variation in the positional relationship between the imaging position and the imaging surface (CCD) due to a change in temperature is sufficiently reduced, and a decrease in image reading accuracy associated with a change in temperature is preferably corrected.

Variation in imaging position (20° C.→40° C.): −0.5 μm

FIG. 2 provides aberration views illustrating the spherical aberration, astigmatism, distortion, and coma aberration in Example 1. In addition, in the aberration views, the dashed line in the spherical aberration denotes a sine condition, and the solid line and the dashed line in the astigmatism denote sagittal and meridional, respectively. These are similar to the aberration views in the other examples.

Example 2

FIG. 3 illustrates a schematic configuration of a longitudinal plane of an optical system of an image reading lens in Example 2 according to Embodiment 2 of the present invention.

The image reading lens illustrated in FIG. 3 includes a first lens E1, a second lens E2, a third lens E3, an aperture AD, a contact glass CTG, and a cover glass CVG.

In FIG. 3, the optical system of the image reading lens includes in order from an image original side such as a subject, namely, an object side to an image side the contact glass CTG, the first lens E1, the aperture AD, the second lens E2, the third lens E3, the fourth lens E4, and the cover glass CVG.

The first lens E1 is a positive meniscus lens including on the object side a surface having a curvature larger than that on the image side and a convex surface. The aperture AD is provided between the first lens E1 and the second lens E2. The second lens E2 is a negative lens made of a biconcave lens including, on the object side, a surface having a curvature larger than that on the image side. The third lens E3 is a positive lens made of a biconvex lens including, on the image side, a surface having a curvature larger than that on the object side, and forms an aspheric surface on the object side. The first lens E1, the aperture AD, the second lens E2, and the third lens E3 constitute the front group lens system Ga.

The fourth lens E4 is a negative meniscus lens including, on the object side, a surface having a curvature larger than that on the image side, and including on the image side a convex surface. The fourth lens E4 includes an aspheric surface on both sides of the object side and the image side, and singly constitutes the back group lens system Gb.

The cover glass CVG is a sealing glass made of a parallel plate for protecting an imaging surface of an imaging element such as a CCD image sensor or a CMOS image sensor which obtains image data by imaging an optical image of an original image with the image reading lens. The cover glass CVG includes various optical filters such as an optical low-pass filter or an infrared cut filter, or a dummy glass instead of the filters.

Namely, the image reading lens body includes the front group lens system Ga having the first to third lenses E1-E3 and the back group lens system Gb having the fourth lens E4. The optical image of the image original which is an object of an imaging target closely placed on the contact glass CTG is imaged behind the cover glass CVG.

In Example 2, F value (F number) F=4.20 and the object height Y=152.4. The optical properties of the optical elements are shown in Table 4 below. In the following Table 4, CTn denotes a refractive index temperature coefficient ($10^{-6}$/° C.), CLE denotes a linear expansion coefficient, AL denotes aluminum, FE denotes iron, CTG denotes the contact glass, AD denotes the aperture, CVG denotes the cover glass, Ga denotes the front group, Gb denotes the back group, E1 denotes the first lens, E2 denotes the second lens, E3 denotes the third lens, E4 denotes the fourth lens, and BF denotes back focusing.

TABLE 4

OPTICAL PROPERTY

| SURFACE NUMBER | R | d | ne | νe | CTn | CLE | REMARK | |
|---|---|---|---|---|---|---|---|---|
| 1 | ∞ | 3.20 | 1.51825 | 63.93 | | | CTG | |
| 2 | ∞ | 29.98 | | | | | | |
| 3* | 16.597 | 3.43 | 1.49845 | 81.14 | −6.1 | 131 | E1 | Ga |
| 4 | 49.168 | 0.70 | | | | 236(AL) | | |
| 5 | ∞ | 0.80 | | | | 236(AL) | AD | |
| 6 | −28.998 | 1.20 | 1.61685 | 36.73 | 3.4 | 77 | E2 | |
| 7 | 50.191 | 3.28 | | | | 236(AL) | | |
| 8 | 43.132 | 3.64 | 1.62112 | 63.55 | −3.0 | 106 | E3 | |
| 9 | −23.735 | 28.20 | | | | 170(FE) | | |
| 10* | −15.109 | 4.00 | 1.53342 | 56.15 | −100 | 600 | E4 | Gb |
| 11* | −66.814 | 3.50 | | | | | | |
| 12 | ∞ | 0.70 | 1.51825 | 63.93 | | | CVG | |
| 13 | ∞ | BF | | | | | | |

In Table 4, the lens surface having the surface number marked with an asterisk "*" is an aspheric surface. Namely, in Table 4, the eighth, tenth, and eleventh surfaces marked with an asterisk "*" are aspheric surfaces, respectively, and the parameters of the aspheric surfaces in the formula (8) are shown in Table 5 below.

TABLE 5

ASPHERIC SURFACE PARAMETER

| SURFACE NUMBER | K | $A_4$ | $A_6$ | $A_8$ | $A_{10}$ |
|---|---|---|---|---|---|
| 8 | 0 | −2.94338E−05 | 2.53919E−08 | −1.23101E−10 | 1.89617E−12 |
| 10 | 0 | −5.29120E−05 | 2.76881E−07 | 2.93215E−10 | 1.35573E−12 |
| 11 | 0 | −6.95268E−05 | 2.52525E−07 | −3.79969E−10 | 3.56321E−13 |

In this case, the values corresponding to the conditional expressions (1)-(7) are shown in Table 6 below, and satisfy the conditional expressions (1)-(7).

TABLE 6

VALUE OF CONDITIONAL EXPRESSION

| CONDITIONAL EXPRESSION | VARIABLE NUMBER | VALUE |
|---|---|---|
| (1) | $\Sigma dn_N/dt\ (N) - \Sigma dn_P/dt\ (P)$ | 12.5 |
| (2) | $fa/f \times d_9/D$ | 0.53 |
| (2') | $(fa/f \times d_9/D)/\alpha$ | 0.31 |
| (3) | $d_9/D$ | 0.62 |
| (4) | $\nu_P - \nu_N$ | 25.91 |
| (5) | $R_9/R_{10}$ | 1.57 |
| (6) | $(R_9 + R_8)/(R_9 - R_8)$ | −0.29 |
| (7) | $fa/fb$ | −0.95 |

Variation in Imaging Position

It is necessary to control the gap between the imaging position and the imaging surface to about ±10 μm, in order to preferably maintain image reading accuracy. When a metal material or a plastic material is used between the final lens and the CCD, the positional relationship between the imaging position and the imaging surface (CCD) can be preferably maintained after a temperature rise as long as variation in an imaging position due to the temperature rise is within the range of −1 to 16 μm in view of the individual difference of the member. The variation in an imaging position associated with a change in the temperature from 20° C. to 40° C. in Example 2 is as follows. It can be known from the following that the variation in the positional relationship between the imaging position and the imaging surface (CCD) due to a change in temperature is sufficiently reduced, and decrease in an image reading accuracy associated with a change in temperature is preferably corrected.

Variation in imaging position (20° C.→40° C.): 7.8 μm

FIG. 4 provides aberration views illustrating spherical aberration, astigmatism, distortion, and coma aberration in Example 2. In addition, in the aberration views, the dashed line in the spherical aberration denotes a sine condition, and the solid line and the dashed line in the astigmatism denote sagittal and meridional, respectively. These are similar to the aberration views in the other examples.

Example 3

FIG. 5 illustrates a schematic configuration of a longitudinal plane of an optical system of an image reading lens in Example 3 according to Embodiment 3 of the present invention.

The image reading lens illustrated in FIG. 5 includes a first lens E1, a second lens E2, a third lens E3, an aperture stop AD, a contact glass CTG, and a cover glass CVG.

In FIG. 5, the optical system of the image reading lens includes in order from an image original side as a subject, namely, an object side to an image side the contact glass CTG, first lens E1, aperture AD, second lens E2, third lens E3, fourth lens E4, and cover glass CVG.

The contract glass CTG is a glass made of a parallel plate having a surface on which an image original is closely placed.

The first lens E1 is a positive lens made of a biconvex lens including, on the object side, a surface having a curvature larger than that on the image side, and forms on the object side an aspheric surface. The aperture stop AD is provided between the first lens E1 and the second lens E2. The second lens E2 is a negative lens made of a biconcave lens including, on the image side, a surface having a curvature larger than that on the object side. The third lens E3 is a positive lens made of a biconvex lens including on the image side a surface having a curvature larger than that on the object side. The first lens E1, the aperture AD, the second lens E2, and the third lens E3 constitute the front group lens system Ga.

The fourth lens E4 is a negative meniscus lens including on the object side a surface having a curvature larger than that on the image side, and forms a convex surface on the image side. The fourth lens E4 includes an aspheric surface on both surfaces of the object side and the image side, and singly constitutes the back group lens system Gb.

The cover glass CVG is a sealing glass made of a parallel plate for protecting an imaging surface of an imaging element such as a CCD image sensor or a CMOS image sensor which obtains image data by imaging an optical image of an original image with the image reading lens. The cover glass CVG includes various optical filters such as an optical low-pass filter or an infrared cut filter, and a dummy glass instead of the filters.

Namely, the image reading lens body includes the front group lens system Ga having the first to third lenses E1 to E3 and the back group lens system Gb having the fourth lens E4. The optical image of the image original which is an object of the imaging target closely placed on the contact glass CTG is imaged behind the cover glass CVG.

In Embodiment 3, the F-number F=F 4.20 and the object height Y=152.4, respectively. The optical properties of the optical elements are shown in Table 7 below. In Table 7, CTn denotes a refractive index temperature coefficient ($10^{-6}/°$ C.), CLE denotes a liner expansion coefficient ($10^{-7}/°$ C.), AL denotes aluminum, FE denotes iron, CTG denotes the contract glass, AD denotes the aperture, CVG denotes the cover glass, Ga denotes the front group, Gb denotes the back group, E1 denotes the first lens, E2 denotes the second lens, E3 denotes the third lens, E4 denotes the fourth lens, and BF denotes back focusing.

TABLE 7

OPTICAL PROPERTY

| SURFACE NUMBER | R | d | ne | ve | CTn | CLE | REMARK | |
|---|---|---|---|---|---|---|---|---|
| 1 | ∞ | 3.20 | 1.51825 | 63.93 | | | CTG | |
| 2 | ∞ | 0.90 | | | | | | |
| 3* | 36.824 | 4.00 | 1.43985 | 94.49 | −6.6 | 145 | E1 | Ga |
| 4 | −159.892 | 2.38 | | | | 236(AL) | | |
| 5 | ∞ | 0.80 | | | | 236(AL) | AD | |
| 6 | −45.565 | 1.20 | 1.65222 | 33.53 | 2.6 | 83 | E2 | |
| 7 | 44.169 | 2.86 | | | | 236(AL) | | |
| 8 | 39.022 | 4.00 | 1.62033 | 63.02 | −3.5 | 101 | E3 | |
| 9 | −23.004 | 28.41 | | | | 170(FE) | | |
| 10* | −13.274 | 4.00 | 1.53342 | 56.15 | −100 | 600 | E4 | Gb |
| 11* | −53.179 | 3.98 | | | | | | |
| 12 | ∞ | 0.70 | 1.51825 | 63.93 | | | CVG | |
| 13 | ∞ | BF | | | | | | |

In Table 7, the lens surface having the surface number marked with an asterisk "*" is an aspheric surface. Namely, in Table 7, the third, tenth, and eleventh optical surfaces marked with an asterisk "*" are aspheric surfaces, respectively, and the parameters of the aspheric surfaces in the formula (8) are shown in Table 8 below.

TABLE 8

ASPHERIC SURFACE PARAMETER

| SURFACE NUMBER | K | $A_4$ | $A_6$ | $A_8$ | $A_{10}$ |
|---|---|---|---|---|---|
| 3 | 0 | 3.20953E−05 | 1.88655E−07 | 1.48835E−09 | −1.37282E−11 |
| 10 | 0 | −8.56917E−05 | 3.49547E−07 | 1.85504E−09 | −1.56340E−11 |
| 11 | 0 | −1.04741E−04 | 4.74932E−07 | −1.29650E−09 | 7.97726E−13 |

In this case, the values corresponding to the conditional expressions (1) to (7) are shown in Table 9 below, and satisfy the conditional expressions (1)-(7).

TABLE 9

VALUE OF CONDITIONAL EXPRESSION

| CONDITIONAL EXPRESSION | VARIABLE NUMBER | VALUE |
|---|---|---|
| (1) | $\Sigma dn_N/dt\,(N) - \Sigma dn_P/dt\,(P)$ | 12.7 |
| (2) | $fa/f \times d_9/D$ | 0.50 |
| (2') | $(fa/f \times d_9/D)/\alpha$ | 0.29 |
| (3) | $d_9/D$ | 0.60 |
| (4) | $v_P - v_N$ | 33.92 |
| (5) | $R_9/R_{10}$ | 1.73 |
| (6) | $(R_9 + R_8)/(R_9 - R_8)$ | −0.26 |
| (7) | $fa/fb$ | −1.02 |

Variation in Imaging Position

It is necessary to control the gap between the imaging surface and the imaging position to about ±10 μm, in order to preferably maintain the image reading accuracy. When a metal material or a plastic material is used between the final lens and the CCD, the positional relationship between the imaging position and the imaging surface (CCD) can be preferably maintained after a temperature rise as long as variation in an imaging position due to the temperature rise is within the range of −1 to 16 μm in view of the individual difference of the member.

The variation in the imaging position associated with a change in temperature from 20° C. to 40° C. in Example 3 is as follows. It can be known from the following that the variation in the positional relationship between the imaging position and the imaging surface (CCD) due to a change in temperature is sufficiently reduced, and decrease in the imaging reading accuracy associated with a change in temperature is preferably corrected.

Variation in imaging position (20° C.→40° C.): 4.7 μm.

FIG. 6 provides aberration views illustrating spherical aberration, astigmatism, distortion, and coma aberration in Example 3. In addition, in the aberration views, the dashed line in the spherical aberration denotes a sine condition, and the solid line and the dashed line in the astigmatism denote sagittal and meridional, respectively. These are similar to the aberration views in the other examples.

Example 4

FIG. 7 illustrates a schematic configuration of a longitudinal plane of an optical system of the image reading lens in Example 4 according to Embodiment 4 of the present invention.

The image reading lens illustrated in FIG. 7 includes a first lens E1, a second lens E2, a third lens E3, an aperture AD, a contact glass CTG, and a cover glass CVG.

In FIG. 7, the optical system of the image reading lens includes in order from an image original side such as a subject, namely, an object side to an image side the contact glass CTG, the first lens E1, the aperture AD, the second lens E2, the third lens E3, the fourth lens E4, and the cover glass CVG.

The contact glass CTG is a glass made of a parallel plate having a surface on which an image original is closely placed.

The first lens E1 is a positive meniscus lens including, on an object side, a surface having a curvature larger than that on the image side, and a convex surface. The first lens E1 forms an aspheric surface on the object side. The aperture AD is disposed between the first lens E1 and the second lens E2. The second lens E2 is a negative lens made of a biconcave lens including on the image side a surface having a curvature larger than that on the object side. The third lens E3 is a positive lens made of a biconvex lens including, on the image side, a surface having a curvature larger than that on the object side. The first lens E1, the aperture AD, the second lens E2, and the third lens E3 constitute the front group lens system Ga.

The fourth lens E4 is a negative lens including, on the object side, a surface having a curvature larger than that on the image side, and forms a concave surface on the object side. The fourth lens E4 forms an aspheric surface on both of the object side and the image side, and singly constitutes the back group lens system Gb.

The cover glass CVG is a sealing glass made of a parallel plate for protecting an imaging surface of an imaging element such as a CCD image sensor or a CMOS image sensor which obtains image data by imaging the optical image of the original image with the image reading lens. The cover glass CVG includes various optical filters such an optical low-pass filter or an infrared cut filter, or a dummy glass instead of the filters.

Namely, the image reading lens body includes the front group lens system Ga having the first to third lenses E1-E3 and the back group lens system Gb having the fourth lens E4. The optical image of the image original which is an object of an imaging target closely placed on the contact glass CTG is imaged behind the cover glass CVG.

In Example 4, the F number F=5.00 and the object height Y=152.4, and the optical properties of the optical elements are shown in Table 10 below. In Table 10, CTn denotes a refractive index temperature coefficient ($10^{-6}/°$ C.), CLE denotes a liner expansion coefficient ($10^{-7}/°$ C.), AL denotes aluminum, FE denotes iron, CTG denotes the contact glass, AD denotes the aperture, CVG denotes the cover glass, Ga denotes the front group, Gb denotes the back group, E1 denotes the first lens, E2 denotes the second lens, E3 denotes the third lens, E4 denotes the fourth lens, and BF denotes back focusing.

In this case, the values corresponding to the conditional expressions (1)-(7) are shown in Table 12 below, and satisfy the conditional expressions (1)-(7).

TABLE 12

VALUE OF CONDITIONAL EXPRESSION

| CONDITIONAL EXPRESSION | VARIABLE NUMBER | VALUE |
|---|---|---|
| (1) | $\Sigma dn_N/dt\ (N) - \Sigma dn_P/dt\ (P)$ | 12.0 |
| (2) | $fa/f \times d_9/D$ | 0.64 |
| (2') | $(fa/f \times d_9/D)/\alpha$ | 0.38 |
| (3) | $d_9/D$ | 0.66 |
| (4) | $\nu_P - \nu_N$ | 20.36 |
| (5) | $R_9/R_{10}$ | 1.13 |
| (6) | $(R_9 + R_8)/(R_9 - R_8)$ | −0.65 |
| (7) | $fa/fb$ | −1.08 |

Variation in Imaging Position

It is necessary to control the gap between the imaging surface and the imaging position to about ±10 μm, in order to preferably maintain the image reading accuracy. When a metal material or a plastic material is used between the final lens and the CCD, the positional relationship between the imaging position and the imaging surface (CCD) can be preferably maintained after a temperature rise as long as variation in an imaging position due to the temperature rise is within the range of −1 to 16 μm in view of the individual difference of the member.

The variation in the imaging position associated with a change in temperature from 20° C. to 40° C. in Example 4 is

TABLE 10

OPTICAL PROPERTY

| SURFACE NUMBER | R | d | ne | ve | CTn | CLE | REMARK | |
|---|---|---|---|---|---|---|---|---|
| 1 | ∞ | 3.20 | 1.51825 | 63.93 | | | CTG | |
| 2 | ∞ | 1.00 | | | | | | |
| 3* | 21.166 | 1.66 | 1.59732 | 67.37 | −5.9 | 117 | E1 | Ga |
| 4 | 260.832 | 2.56 | | | | 236(AL) | | |
| 5 | ∞ | 1.00 | | | | 236(AL) | AD | |
| 6 | −125.411 | 1.20 | 1.65222 | 33.53 | 2.6 | 83 | E2 | |
| 7 | 24.844 | 6.26 | | | | 236(AL) | | |
| 8 | 117.220 | 2.32 | 1.62033 | 63.02 | −3.5 | 101 | E3 | |
| 9 | −24.615 | 33.00 | | | | 170(FE) | | |
| 10* | −21.829 | 2.00 | 1.53342 | 56.15 | −100 | 600 | E4 | Gb |
| 11* | 190.395 | 3.82 | | | | | | |
| 12 | ∞ | 0.70 | 1.51825 | 63.93 | | | CVG | |
| 13 | ∞ | BF | | | | | | |

In the Table 10, the lens surface having the surface number marked with an asterisk "*" is an aspheric surface. Namely, in Table 10, the third, tenth, and eleventh optical surfaces marked with an asterisk "*" are aspheric surfaces, and the parameters of the aspheric surfaces in the formula (8) are shown in Table 11 below.

as follows. It can be known from the following that the variation in the positional relationship between the imaging position and the imaging surface (CCD) due to a change in temperature is sufficiently reduced, and decrease in the imaging reading accuracy associated with a change in temperature is preferably corrected.

TABLE 11

ASPHERIC SURFACE PARAMETER

| SURFACE NUMBER | K | $A_4$ | $A_6$ | $A_8$ | $A_{10}$ |
|---|---|---|---|---|---|
| 3 | 0 | −1.76445E−05 | 1.13642E−07 | −6.76590E−09 | 6.22171E−11 |
| 10 | 0 | −1.10672E−04 | 1.17000E−06 | −4.86285E−09 | 6.85934E−12 |
| 11 | 0 | −1.36102E−04 | 9.57702E−07 | −3.05564E−09 | 3.30855E−12 |

Variation in imaging position (20° C.→40° C.): 15.5 μm.

FIG. 8 provides aberration views illustrating spherical aberration, astigmatism, distortion, and coma aberration in Example 4. In addition, in the aberration views, the dashed line in the spherical aberration denotes a sine condition, and the solid line and the dashed line in the astigmatism denote sagittal and meridional, respectively. These are similar to the aberration views in the other examples.

Example 5

FIG. 9 illustrates a schematic configuration of a longitudinal plane of an optical system of the image reading lens in Example 5 according to Embodiment 5 of the present invention.

The image reading lens illustrated in FIG. 9 includes a first lens E1, a second lens E2, a third lens E3, an aperture AD, a contact glass CTG, and a cover glass CVG.

In FIG. 9, the optical system of the image reading lens includes in order from an image original side such as a subject, namely, an object side to an image side the contact glass CTG, the first lens E1, the aperture AD, the second lens E2, the third lens E3, the fourth lens E4, and the cover glass CVG.

The contact glass CTG is a glass made of a parallel plate having a surface on which an image original is closely placed.

The first lens E1 is a positive lens made of a biconvex lens including, on the object side, a surface having a curvature larger than that on the image side. The first lens E1 forms an aspheric surface on the object side. The aperture AD is disposed between the first lens E1 and the second lens E2. The second lens E2 is a negative lens made of a biconcave lens including, on an image side, a surface having a curvature larger than that on the object side. The third lens E3 is a positive lens made of a biconvex lens including on the image side a surface having a curvature larger than that on the object side. The first lens E1, the aperture AD, the second lens E2, and the third lens E3 constitute the front group lens system Ga.

The fourth lens E4 is a negative meniscus lens including, on the object side, a surface having a curvature larger than that on the image side, and forms a convex surface on the image side. The fourth lens E4 forms an aspheric surface on both of the object side and the image side, and singly constitutes the back group lens system Gb.

The cover glass CVG is a sealing glass made of a parallel plate for protecting an imaging surface of an imaging element such as a CCD image sensor or a CMOS image sensor which obtains image data by imaging the optical image of the original image with the image reading lens. The cover glass CVG includes various optical filters such an optical low-pass filter or an infrared cut filter, or a dummy glass instead of the filters.

Namely, the image reading lens body includes the front group lens system Ga having the first to third lenses E1-E3, and the back group lens system Gb having the fourth lens E4. The optical image of the image original which is an object of an imaging target closely placed on the contact glass CTG is imaged behind the cover glass CVG.

In Example 5, the F number F=5.00 and the object height Y=152.4, and the optical properties of the optical elements are shown in Table 13 below. In the following Table 13, CTn denotes a refractive index temperature coefficient ($10^{-6}/°$ C.), CLE denotes a liner expansion coefficient ($10^{-7}/°$ C.), AL denotes aluminum, FE denotes iron, CTG denotes the contact glass, AD denotes the aperture, CVG denotes the cover glass, Ga denotes the front group, Gb denotes the back group, E1 denotes the first lens, E2 denotes the second lens, E3 denotes the third lens, E4 denotes the fourth lens, and BF denotes back focusing.

TABLE 13

OPTICAL PROPERTY

| SURFACE NUMBER | R | d | ne | ve | CTn | CLE | REMARK | |
|---|---|---|---|---|---|---|---|---|
| 1 | ∞ | 3.20 | 1.51825 | 63.93 | | | CTG | |
| 2 | ∞ | 1.00 | | | | | | |
| 3* | 21.507 | 1.76 | 1.59732 | 67.37 | −5.9 | 117 | E1 | Ga |
| 4 | −582.346 | 0.70 | | | | 236(AL) | | |
| 5 | ∞ | 1.00 | | | | 236(AL) | AD | |
| 6 | −50.719 | 1.95 | 1.65222 | 33.53 | 2.6 | 83 | E2 | |
| 7 | 37.940 | 5.41 | | | | 236(AL) | | |
| 8 | 50.240 | 4.00 | 1.62033 | 63.02 | −3.5 | 101 | E3 | |
| 9 | −31.427 | 23.20 | | | | 170(FE) | | |
| 10* | −12.973 | 4.00 | 1.53342 | 56.15 | −100 | 600 | E4 | Gb |
| 11* | −44.954 | 7.62 | | | | | | |
| 12 | ∞ | 0.70 | 1.51825 | 63.93 | | | CVG | |
| 13 | ∞ | BF | | | | | | |

In the Table 13, the lens surface having the surface number marked with an asterisk "*" is an aspheric surface. Namely, in Table 13, the third, tenth, and eleventh optical surfaces marked with an asterisk "*" are aspheric surfaces, and the parameters of the aspheric surfaces in the formula (8) are shown Table 14 below.

TABLE 14

ASPHERIC SURFACE PARAMETER

| SURFACE NUMBER | K | $A_4$ | $A_6$ | $A_8$ | $A_{10}$ |
|---|---|---|---|---|---|
| 3 | 0 | 1.19025E−05 | 8.34617E−08 | −5.63000E−09 | 7.48063E−11 |
| 10 | 0 | −9.92518E−05 | 5.40913E−07 | −2.97350E−09 | 1.67613E−11 |
| 11 | 0 | −9.43684E−05 | 3.57190E−07 | −1.01688E−09 | 1.57181E−12 |

In this case, the values corresponding to the conditional expressions (1)-(7) are shown in Table 15 below, and satisfy the conditional expressions (1)-(7).

TABLE 15

VALUE OF CONDITIONAL EXPRESSION

| CONDITIONAL EXPRESSION | VARIABLE NUMBER | VALUE |
|---|---|---|
| (1) | $\Sigma dn_N/dt\ (N) - \Sigma dn_P/dt\ (P)$ | 12.0 |
| (2) | $fa/f \times d_9/D$ | 0.44 |
| (2') | $(fa/f \times d_9/D)/\alpha$ | 0.26 |
| (3) | $d_9/D$ | 0.55 |
| (4) | $\nu_P - \nu_N$ | 20.36 |
| (5) | $R_9/R_{10}$ | 2.42 |
| (6) | $(R_9 + R_8)/(R_9 - R_8)$ | -0.23 |
| (7) | $fa/fb$ | -0.95 |

Variation in Imaging Position

It is necessary to control the gap between the imaging surface and the imaging position to about ±10 μm, in order to preferably maintain the image reading accuracy. When a metal material or a plastic material is used between the final lens and the CCD, the positional relationship between the imaging position and the imaging surface (CCD) can be preferably maintained after a temperature rise as long as variation in an imaging position due to the temperature rise is within the range of −1 to 16 μm in view of the individual difference of the member.

The variation in the imaging position associated with a change in temperature from 20° C. to 40° C. in Example 5 is as follows. It can be known from the following that the variation in the positional relationship between the imaging position and the imaging surface (CCD) due to a change in temperature is sufficiently reduced, and decrease in the imaging reading accuracy associated with a change in temperature is preferably corrected.

Variation in imaging position (20° C.→40° C.): −0.7 μm.

FIG. 10 provides aberration views illustrating spherical aberration, astigmatism, distortion, and coma aberration in Example 5. In addition, in the aberration views, the dashed line in the spherical aberration denotes a sine condition, and the solid line and the dashed line in the astigmatism denote sagittal and meridional, respectively. These are similar to the aberration views in the other examples.

Example 6

FIG. 11 illustrates a schematic configuration of a longitudinal plane of an optical system of the image reading lens in Example 6 according to Embodiment 6 of the present invention.

The image reading lens illustrated in FIG. 11 includes a first lens E1, a second lens E2, a third lens E3, an aperture AD, a contact glass CTG, and a cover glass CVG.

In FIG. 11, the optical system of the image reading lens includes in order from an image original side such as a subject, namely, an object side to an image side the contact glass CTG, the first lens E1, the aperture AD, the second lens E2, the third lens E3, the fourth lens E4, and the cover glass CVG.

The contact glass CTG is a glass made of a parallel plate having a surface on which an image original is closely placed.

The first lens E1 is a positive lens made of a biconvex lens including, on an object side, a surface having a curvature larger than that on the image side. The first lens E1 forms an aspheric surface on the object side. The aperture AD is disposed between the first lens E1 and the second lens E2. The second lens E2 is a negative lens made of a biconcave lens including, on the image side, a surface having a curvature larger than that on the object side. The third lens E3 is a positive lens made of a biconvex lens including, on the image side, a surface having a curvature larger than that on the object side. The first lens E1, the aperture AD, the second lens E2, and the third lens E3 constitute the front group lens system Ga.

The fourth lens E4 is a negative meniscus lens including, on the object side, a surface having a curvature larger than that on the image side, and forms a convex surface on the image side. The fourth lens E4 forms an aspheric surface on both of the object side and the image side, and singly constitutes the back group lens system Gb.

The cover glass CVG is a sealing glass made of a parallel plate for protecting an imaging surface of an imaging element such as a CCD image sensor or a CMOS image sensor which obtains image data by imaging the optical image of the original image with the image reading lens. The cover glass CVG includes various optical filters such an optical low-pass filter or an infrared cut filter, or a dummy glass instead of the filters.

Namely, the image reading lens body includes the front group lens system Ga having the first to third lenses E1-E3, and the back group lens system Gb having the fourth lens E4. The optical image of the image original which is an object of an imaging target closely placed on the contact glass CTG is imaged behind the cover glass CVG.

In Example 6, the F number F=4.20 and the object height Y=152.4, and the optical properties of the optical elements are shown in Table 16 below. In the following Table 16, CTn denotes a refractive index temperature coefficient ($10^{-6}/°$ C.), CLE denotes a liner expansion coefficient ($10^{-7}/°$ C.), AL denotes aluminum, FE denotes iron, CTG denotes the contact glass, AD denotes the aperture, CVG denotes the cover glass, Ga denotes the front group, Gb denotes the back group, E1 denotes the first lens, E2 denotes the second lens, E3 denotes the third lens, E4 denotes the fourth lens, and BF denotes back focusing.

TABLE 16

OPTICAL PROPERTY

| SURFACE NUMBER | R | d | ne | ve | CTn | CLE | REMARK | |
|---|---|---|---|---|---|---|---|---|
| 1 | ∞ | 3.20 | 1.51825 | 63.93 | | | CTG | |
| 2 | ∞ | 4.66 | | | | | | |
| 3* | 18.205 | 4.00 | 1.59732 | 67.37 | −5.9 | 117 | E1 | Ga |
| 4 | −68.880 | 0.70 | | | | 236(AL) | | |
| 5 | ∞ | 0.80 | | | | 236(AL) | AD | |
| 6 | −26.975 | 1.48 | 1.60718 | 37.76 | 2.8 | 83 | E2 | |
| 7 | 21.871 | 4.72 | | | | 236(AL) | | |
| 8 | 70.500 | 2.50 | 1.65376 | 55.89 | 1.4 | 71 | E3 | |
| 9 | −25.594 | 25.27 | | | | 170(FE) | | |

TABLE 16-continued

OPTICAL PROPERTY

| SURFACE NUMBER | R | d | ne | ve | CTn | CLE | REMARK | |
|---|---|---|---|---|---|---|---|---|
| 10* | −15.902 | 4.00 | 1.53342 | 56.15 | −100 | 600 | E4 | Gb |
| 11* | −52.534 | 7.21 | | | | | | |
| 12 | ∞ | 0.70 | 1.51825 | 63.93 | | | CVG | |
| 13 | ∞ | BF | | | | | | |

In Table 16, the lens surface having the surface number marked with an asterisk "*" is an aspheric surface. Namely, in Table 16, the third, tenth, and eleventh optical surfaces marked with an asterisk "*" are aspheric surfaces, and the parameters of the aspheric surfaces in the formula (8) are shown in Table 17 below.

TABLE 17

ASPHERIC SURFACE PARAMETER

| SURFACE NUMBER | K | $A_4$ | $A_6$ | $A_8$ | $A_{10}$ |
|---|---|---|---|---|---|
| 3 | 0 | −5.43878E−06 | −1.24290E−08 | 9.14235E−10 | −7.91793E−12 |
| 10 | 0 | −9.44519E−05 | 2.40204E−07 | 1.56932E−10 | 7.99372E−13 |
| 11 | 0 | −9.97174E−05 | 2.88659E−07 | −3.67887E−10 | 3.07089E−13 |

In this case, the values corresponding to the conditional expressions (1)-(7) are shown in Table 18 below, and satisfy the conditional expressions (1)-(7).

TABLE 18

VALUE OF CONDITIONAL EXPRESSION

| CONDITIONAL EXPRESSION | VARIABLE NUMBER | VALUE |
|---|---|---|
| (1) | $\Sigma dn_N/dt\ (N) - \Sigma dn_P/dt\ (P)$ | 7.3 |
| (2) | $fa/f \times d_9/D$ | 0.50 |
| (2') | $(fa/f \times d_9/D)/\alpha$ | 0.29 |
| (3) | $d_9/D$ | 0.58 |
| (4) | $\nu_P - \nu_N$ | 14.68 |
| (5) | $R_9/R_{10}$ | 1.61 |
| (6) | $(R_9 + R_8)/(R_9 - R_8)$ | −0.47 |
| (7) | fa/fb | −0.82 |

Variation in Imaging Position

It is necessary to control the gap between the imaging surface and the imaging position to about ±10 µm, in order to preferably maintain the image reading accuracy. When a metal material or a plastic material is used between the final lens and the CCD, the positional relationship between the imaging position and the imaging surface (CCD) can be preferably maintained after a temperature rise as long as variation in an imaging position due to the temperature rise is within the range of −1 to 16 µm in view of the individual difference of the member.

The variation in the imaging position associated with a change in temperature from 20° C. to 40° C. in Example 6 is as follows. It can be known from the following that the variation in the positional relationship between the imaging position and the imaging surface (CCD) due to a change in temperature is sufficiently reduced, and decrease in the imaging reading accuracy associated with change in a temperature is preferably corrected.

Variation in imaging position (20° C.→40° C.): 2.5 µm.

FIG. 12 provides aberration views illustrating spherical aberration, astigmatism, distortion, and coma aberration in Example 6. In addition, in the aberration views, the dashed line in the spherical aberration denotes a sine condition, and the solid line and the dashed line in the astigmatism denote sagittal and meridional, respectively. These are similar to the aberration views in the other examples.

Example 7

FIG. 13 illustrates a schematic configuration of a longitudinal plane of an optical system of the image reading lens in Example 7 according to Embodiment 7 of the present invention.

The image reading lens illustrated in FIG. 13 includes a first lens E1, a second lens E2, a third lens E3, an aperture AD, a contact glass CTG, and a cover glass CVG.

In FIG. 13, the optical system of the image reading lens includes in order from an image original side such as a subject, namely, an object side to an image side the contact glass CTG, the first lens E1, the aperture AD, the second lens E2, the third lens E3, the fourth lens E4, and the cover glass CVG.

The contact glass CTG is a glass made of a parallel plate having a surface on which an image original is closely placed.

The first lens E1 is a positive meniscus lens including, on the object side, a convex surface. The second lens E2 is a negative meniscus lens including on the object side a convex surface. The aperture AD is disposed between the second lens E2 and the third lens E3. The third lens E3 is a positive meniscus lens including, on the image side, a convex surface. The first lens E1, the second lens E2, the aperture AD, and the third lens E3 constitute the front group lens system Ga. The fourth lens E4 is a negative meniscus lens including, on the image side, a convex surface. The fourth lens E4 forms an aspheric surface on both of the object side and the image side, and singly constitutes the back group lens system Gb.

The cover glass CVG is a sealing glass made of a parallel plate for protecting an imaging surface of an imaging element such as a CCD image sensor or a CMOS image sensor which obtains image data by imaging the optical image of the original image with the image reading lens.

Namely, the image reading lens body includes the front group lens system Ga having the first to third lenses E1-E3, and the back group lens system Gb having the fourth lens E4. The optical image of the image original which is an object of an imaging target closely placed on the contact glass CTG is imaged behind the cover glass CVG.

In Example 7, the F number F=4.20 and the object height Y=152.4, and the optical properties of the optical elements are shown in Table 19 below. In Table 19 below, CTn denotes a refractive index temperature coefficient ($10^{-6}/°$ C.), CLE denotes a liner expansion coefficient ($10^{-7}/°$ C.), AL denotes aluminum, FE denotes iron, CTG denotes the contact glass, AD denotes the aperture, CVG denotes the cover glass, Ga denotes the front group, Gb denotes the back group, E1 denotes the first lens, E2 denotes the second lens, E3 denotes the third lens, E4 denotes the fourth lens, and BF denotes back focusing.

TABLE 19

OPTICAL PROPERTY

| SURFACE NUMBER | R | d | ne | νe | CTn | CLE | REMARK | |
|---|---|---|---|---|---|---|---|---|
| 1 | ∞ | 3.20 | 1.51825 | 63.93 | | | CTG | |
| 2 | ∞ | 5.50 | | | | | | |
| 3* | 14.826 | 2.86 | 1.43985 | 94.49 | −6.6 | 145 | E1 | Ga |
| 4 | 97.336 | 1.01 | | | | 236(AL) | | |
| 5 | 33.721 | 1.20 | | | | 82.00 | E2 | |
| 6 | 18.218 | 3.66 | 1.69417 | 30.84 | 3.0 | 236(AL) | | |
| 7 | ∞ | 6.52 | | | | 236(AL) | AD | |
| 8 | −567.321 | 4.00 | 1.62033 | 63.02 | −3.5 | 101 | E3 | |
| 9 | −24.562 | 21.55 | | | | 170(FE) | | |
| 10* | −14.546 | 3.65 | 1.53342 | 56.15 | −100 | 600 | E4 | Gb |
| 11* | −195.040 | 7.21 | | | | | | |
| 12 | ∞ | 0.70 | 1.51825 | 63.93 | | | CVG | |
| 13 | ∞ | BF | | | | | | |

In the Table 19, the lens surface having the surface number marked with an asterisk "*" is an aspheric surface. Namely, in Table 19, the fifth, tenth, and eleventh optical surfaces marked with an asterisk "*" are aspheric surfaces, and the parameters of the aspheric surfaces in the formula (8) are shown in Table 20 below.

TABLE 20

ASPHERIC SURFACE PARAMETER

| SURFACE NUMBER | K | $A_4$ | $A_6$ | $A_8$ | $A_{10}$ |
|---|---|---|---|---|---|
| 5 | 0 | −3.08406E−05 | −1.38295E−07 | 2.70013E−09 | −3.30009E−11 |
| 10 | 0 | −1.29517E−05 | 6.49828E−07 | −4.08027E−09 | 1.45379E−11 |
| 11 | 0 | −4.52789E−05 | 3.27729E−07 | −1.50237E−09 | 2.62369E−12 |

In this case, the values corresponding to the conditional expressions (1)-(7) are as the following Table 21, and satisfy the conditional expressions (1)-(7).

TABLE 21

VALUE OF CONDITIONAL EXPRESSION

| CONDITIONAL EXPRESSION | VARIABLE NUMBER | VALUE |
|---|---|---|
| (1) | $\Sigma dn_N/dt$ (N) − $\Sigma dn_P/dt$ (P) | 13.1 |
| (2) | fa/f × $d_9$/D | 0.41 |
| (2') | (fa/f × $d_9$/D)/α | 0.24 |
| (3) | $d_9$/D | 0.48 |
| (4) | $\nu_P − \nu_N$ | 35.26 |
| (5) | $(R_9 + R_8)/(R_9 − R_8)$ | −1.09 |

TABLE 21-continued

VALUE OF CONDITIONAL EXPRESSION

| CONDITIONAL EXPRESSION | VARIABLE NUMBER | VALUE |
|---|---|---|
| (6) | fa/fb | −1.173 |
| (7) | $R_9/R_{10}$ | 1.69 |

Variation in Imaging Position

It is necessary to control the gap between the imaging surface and the imaging position to about ±10 μm, in order to preferably maintain the image reading accuracy. When a metal material or a plastic material is used between the final lens and the CCD, the positional relationship between the imaging position and the imaging surface (CCD) can be preferably maintained after a temperature rise as long as variation in an imaging position due to the temperature rise is within the range of −1 to 16 μm in view of the individual difference of the member.

The variation in the imaging position associated with a change in temperature from 20° C. to 40° C. in Example 7 is as follows. It can be known from the following that the variation in the positional relationship between the imaging position and the imaging surface (CCD) due to a change in temperature is sufficiently reduced, and decrease in the imaging reading accuracy associated with a change in temperature is preferably corrected.

Variation in imaging position (20° C.→40° C.): 3.1 μm.

FIG. 14 provides aberration views illustrating spherical aberration, astigmatism, distortion, and coma aberration in Example 7. In addition, in the aberration views, the dashed line in the spherical aberration denotes a sine condition, and the solid line and the dashed line in the astigmatism denote

Embodiment 8

Next, an image reader according to Embodiment 8 of the present invention in which the image reading lens as described in Examples 1-7 according to Embodiments 1-7 of the present invention is adopted as an imaging lens for reading an image will be described with reference to FIG. 15.

Figure 15:
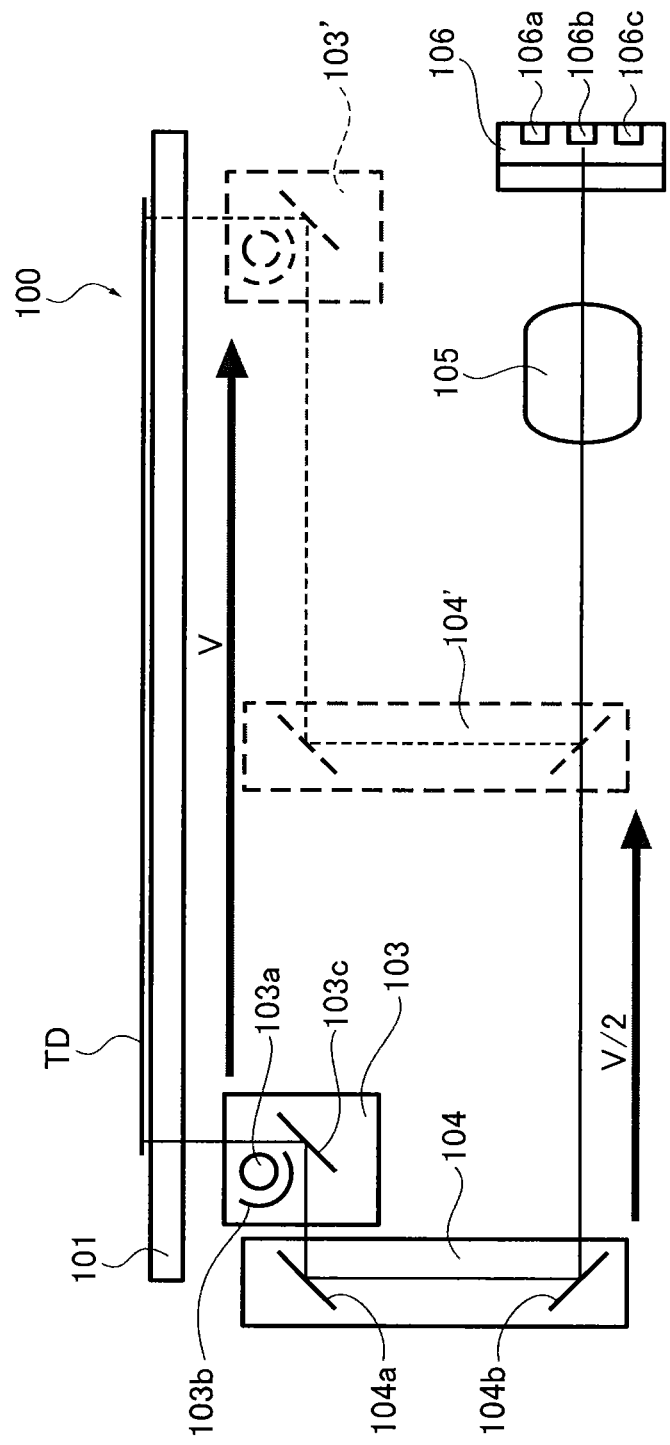
FIG. 15 is a sectional view illustrating a schematic configuration of a main portion of an image reader according to Embodiment 8 of the present invention.

FIG. 15 is a view illustrating a schematic configuration of a longitudinal plane of the image reader according to Embodiment 8 of the present invention. In the image reader according to Embodiment 8, the image reading lens according to Examples 1-7 of Embodiments 1-7 is used as an imaging lens.

The image reader 100 illustrated in FIG. 15 includes a contact glass 101, first running body 103, second running body 104, image reading lens 105, and line sensor 106. The first running body 103 includes an illumination light source 103a, light source mirror 103b, and first mirror 103c. The second running body 104 includes the second mirror 104a and the third mirror 104b. The line sensor 106 includes red (R), green (G), and blue (B) filters as a color decomposer, and photoelectric conversion elements 106a, 106b, 106c constituting a three-line CCD sensor. The image reading lens 105 is the reading lens according to Embodiments 1-7.

In FIG. 15, the original TD as a reading target on which an image to be read is described is placed face-down on the flat contact glass 101 as a platen. The first running body 103 disposed under the contact glass 101 includes the illumination light source 103a extending in the direction orthogonal to FIG. 15, the light source mirror 103b, and the first mirror 103c, and moves from the position illustrated as the first running body 103 in FIG. 15 to the position illustrated as the first running body 103' at a constant running speed V.

The illumination light source 103a is a slender light source having a longitudinal direction in the direction orthogonal to FIG. 15. The illumination light source 103a includes a halogen lamp, Xe (so-called xenon) lamp, tube lamp such as a fluorescent lamp, for example, a cold-cathode tube, light source in which point light sources are arranged in line such as an LED (light-emitting diode), liner light source using a light guiding body which converts a point light source into a liner light source, or slender surface-emitting light source represented by an organic EL (electroluminescence). The illumination light source 103a is controlled such that the first running body 103 emits light upon the movement in the right direction in FIG. 15. The emission of the illumination light source 103a is guided by the long half-cylindrical light source mirror 103b in the direction orthogonal to FIG. 15, so as to illuminate a long slit portion in the main-scanning direction orthogonal to FIG. 15 on the original TD placed on the contact glass 101.

The first mirror 103c is held in the first running body 103 with a mirror surface being inclined at 45 degrees relative to the original-placing surface of the contact glass 101.

The second running body 104 extends in the direction orthogonal to FIG. 15, and holds a pair of second mirror 104a and third mirror 104b with mirror surfaces being inclined orthogonal to each other. This second running body 104 displaces to the position illustrated as the second running body 104' in synchronization with the displacement of the first running body 103 at a predetermined running speed V/2 (namely, half the speed of first running body 103).

After the reflection light (refection light by image) from the illuminated portion of the original TD is reflected by the first mirror 103c provided in the first running body 103, the reflection light is reflected by the second mirror 104a and the third mirror 104b provided in the second running body 104 in order, and enters the image reading lens 105, so that a reduced optical image of the original image is formed on the imaging surface (input surface) of the line sensor 106 by the image reading lens 105 through the cover glass of the line sensor 106 as the imaging element.

Namely, the first mirror 103c, second mirror 104a, and third mirror 104b constitute the reflection optical system. The first running body 103 and the second running body 104 run in the arrow direction (right direction in figure) by a not-shown driver. In this case, where the running speed of the first running body 103 is V, the running speed of the second running body 104 is V/2. The second running body 104 moves by the half of the displacement of the first running body 103 during a predetermined running amount of the first running body 103. The first and second running bodies 103, 104 displace to the position illustrated by the dashed line by the running. The illumination light source 103a, light source mirror 103b, and the first mirror 103c move integrally with the first running body 103, and illuminate and scan the entire original TD on the contact glass 101. As described above, the movement speed ratio of the first running body 103 and the second running body 104 is V:V/2=2:1, so that the optical length from the illuminated and scanned original portion to the image reading lens 105 is maintained unchanged.

The line sensor 106 as the imaging element is a three-line CCD sensor in which liner photoelectric conversion elements 106a, 106b, 106c having red, green and blue filters as a color decomposer are arranged on one chip. The original image is converted into image signals along the illumination scanning of the original TD. As described above, the original TD is read, and the color image of the original TD is decomposed into three primary colors, red, green, and blue to be read.

The image reader 100 is a device which reads a full-color image. The color decomposer such as a red, green and blue filter provided in the line sensor 116 is provided in the imaging optical path of the image reading lens 105.

As described above, the imaging light beams entering the image reading lens 105 image the reduced image of the original TD on the light-receiving surface of the line sensor 106 as the imaging element. In this case, the line sensor 106 is a CCD line sensor in which minute photoelectric convertors are closely arranged in the direction orthogonal to FIG. 15, and outputs the original image as electric signals per pixel according to the illumination and scanning of the original TD. As described above, the line sensor 106 decomposes the image into three primary colors (red, green, and blue) to read color information, and synthesizes the electric signals converted by the photoelectric converter of each color, so that a color original can be read. The electric signals are converted into image signals through a signal process such as AD (analogue-digital) convertor, and the image signals are stored in a not-shown memory according to need.

Accordingly, the image reader can be downsized by using the image reading lens according to the present invention to the image reading lens 105 illustrated in FIG. 15.

A color decomposing method is not limited to the above method, and includes a configuration which selectively inserts a color decomposing prism or a filter between the image reading lens and the line sensor, so as to decompose into red, green and blue, or a configuration which illuminates an original by sequentially lighting red, green and blue light sources.

Namely, the image reader according to Embodiment 8 is an image reader using the image reading lens according to Embodiments 1-7 as an imaging lens. The image reader full-color reads original information by providing the color decomposing function in the imaging optical path with the imaging lens.

Embodiment 9

The image reader can be an image reader including an image reading unit integrally having an illumination device which illuminates an original on a contact glass in a slit form, a line sensor, a plurality of mirrors forming an imaging optical path from the illuminated portion of the original to the line sensor, and an image reading lens disposed on the imaging optical path. The image reader is configured to read and scan the original by running the image reading unit relative to the original with a driver. This is the configuration of the image reader according to Embodiment 9 of the present invention.

Namely, the image reader according to Embodiment 9 of the present invention including the image reading lens according to Embodiment 1-7 of the present invention is adopted as an imaging lens for reading an image will be described with reference to FIG. 16.

Figure 16:
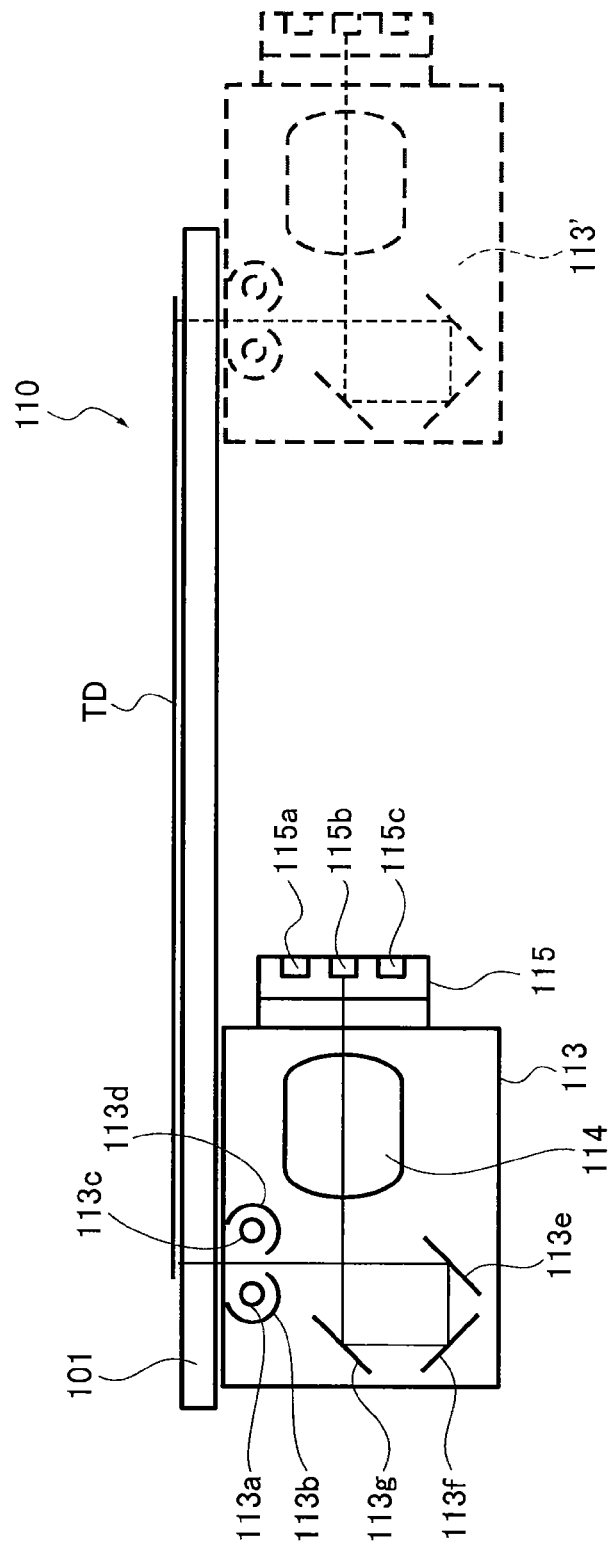
FIG. 16 is a sectional view illustrating a schematic configuration of a main portion of an image reader according to Embodiment 9 of the present invention.

FIG. 16 illustrates a schematic configuration of a longitudinal plane of an image reader according to Embodiment 9 of the present invention. In the image reader according to Example 9 of Embodiment 9, the image reading lens according to Examples 1-7 of Embodiments 1-7 is used as the imaging lens for reading an image.

The image reader 110 illustrated in FIG. 16 includes a contact glass 101, image reading unit 113, image reading lens 114, and line sensor 115.

The image reading unit 113 includes a first illumination light source 113$a$, first light source mirror 113$b$, second illumination light source 113$c$, second light source mirror 113$d$, first mirror 113$e$, second mirror 113$f$, and third mirror 113$g$. The line sensor 115 includes red, green, and blue filters as a color decomposer, and photoelectric conversion elements 115$a$, 115$b$, 115$c$ constituting a three-line CCD sensor. The image reading lens 114 uses a reading lens according to the above Embodiments 1-7.

In FIG. 16, the original TD as a reading target on which an image to be read is described is face-down placed on the flat contact glass 101 as a platen. The image reading unit 113 disposed under the contact glass 101 holds the first illumination light source 113$a$, first light source mirror 113$b$, second light source mirror 113$c$, second light source mirror 113$d$, first mirror 113$e$, second mirror 113$f$, and third mirror 113$g$, which extend in the direction orthogonal to FIG. 16. The image reading lens 114 and the line sensor 115 are integrated with the image reading unit 113.

The first illumination light source 113$a$ and the second illumination light source 113$c$ are slender light sources each having the longitudinal direction in the direction orthogonal to FIG. 16. The first illumination light source 113$a$ and the second illumination light source 113$c$ can be, similar to the illumination light source 103$a$ in FIG. 15, a halogen lamp, Xe (xenon lamp), or a tube lamp such as a fluorescent lamp, for example a cold-cathode tube. The first illumination light source 113$a$ and the second illumination light source 113$c$ can be a light source in which point light sources are arranged in line such as LEDs (light-emitting diode), a linear light source using a conductor which converts a point light source into a liner light source, or a slender surface-emitting light source such as an organic EL (electroluminescence). The first and second illumination light sources 113$a$, 113$c$ are controlled such that the image reading unit 113 emits light upon displacement in the right direction in FIG. 16. The emission of the first and second light sources 113$a$, 113$c$ are guided by the semi-tubular first and second light source mirrors 113$b$, 113$d$ extending in the direction orthogonal to FIG. 16, so as to illuminate a slit portion extending in the main-scanning direction orthogonal to FIG. 16 in the original TD placed on the contact glass 101.

The first mirror 113$e$, second mirror 113$f$, and third mirror 113$g$ extend in the direction orthogonal to FIG. 16, include a mirror surface inclined at 45 degrees relative to the surface of the contact glass 101 on which the original is placed, and are held in the image reading unit 113 with the mirror surfaces being inclined orthogonal to each other.

While the image reading unit 113 moves at a constant speed from the position of the image reading unit 113 illustrated in FIG. 16 to the position illustrated as the image reading unit 113', the reflection light from the illuminated portion of the original TD is sequentially reflected by the first mirror 113$e$ provided in the image reading unit 113, the second mirror 113$f$ provided in the image reading unit 113, and the third mirror 113$g$ provided in the image reading unit 113, enters the image reading lens 114, and images a reduced optical image of an original image on the imaging surface (input surface) of the line sensor 115 through the cover glass of the line sensor 115 as an imaging element.

Namely, the first mirror 113$e$, second mirror 113$f$, and third mirror 113$g$ constitute the reflection optical system. The image reading unit 113 runs in the right direction in FIG. 16 with a not-shown driver.

Therefore, while the image reading unit 113 displaces to the position illustrated as the image reading unit 113', the original TD is illuminated and scanned. When the original TD is illuminated and scanned, the reflection light of the illumination light from the original TD is sequentially reflected by the first mirror 113$e$, second mirror 113$f$, and third mirror 113$g$, and enters the image reading lens 114 as an imaging light beam.

In this case, all of the first mirror 113$e$, second mirror 113$f$, and third mirror 113$g$ are integrally held in the image reading unit 113, such that the optical path length from the illuminated portion of the original TD to the image reading lens 114 during the illumination and scanning of the original TD is constant.

The imaging light beam after entering the image reading lens 114 reduces and images the image of the original TD on the light-receiving surface of the line sensor 115 as an imaging element by the imaging function of the image reading lens 114. The image formed on the light-receiving surface of the line sensor 115 is converted into electric signals similar to Embodiment 8 of the image reader, so that image information is read.

Embodiment 10

In Embodiment 10 of the present invention, an image-forming apparatus includes the image reader illustrated in Embodiment 8 or Embodiment 9. The image-forming apparatus according to Embodiment 10 will be described with reference to FIG. 17.

Figure 17:
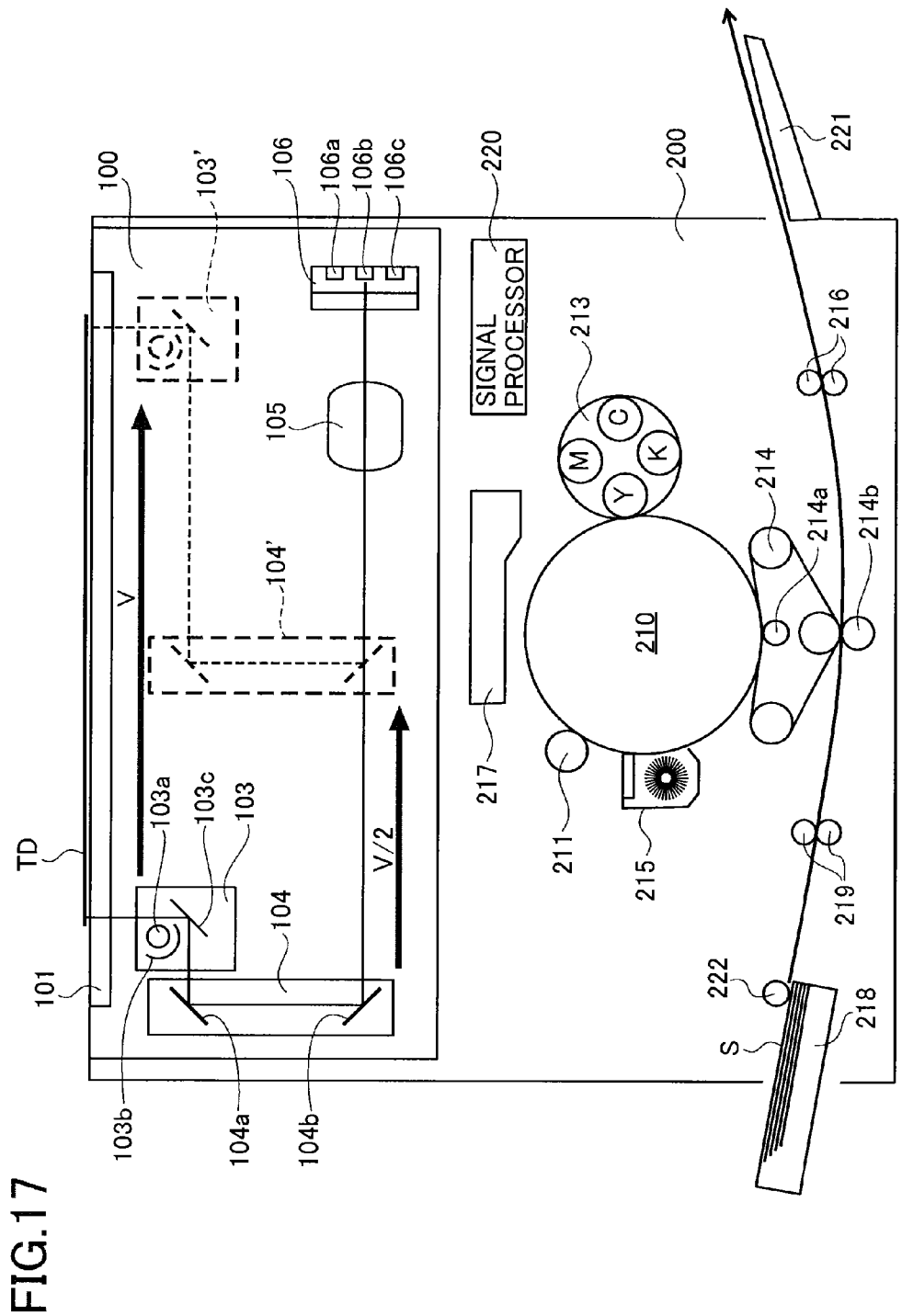
FIG. 17 is a sectional view illustrating a schematic configuration of a main portion of an image-forming apparatus according to Embodiment 10 of the present invention.

FIG. 17 illustrates a schematic configuration of a longitudinal plane of an image-forming apparatus according to Embodiment 10 of the present invention. In the image-forming apparatus, the image reader according to Embodiment 8 is used for reading an image.

The image-forming apparatus illustrated in FIG. 17 includes an image reader 100 and an image-forming portion 200. The image reader 100 includes the configuration similar to that in FIG. 15. The same reference numbers are applied to the portions similar to those in FIG. 15, and thus, the detailed description thereof will be omitted. Namely, the image reader 100 includes a contact glass 101, first running body 103, second running body 104, image reading lens 105, and line sensor 106. The first running body 103 includes an illumination light source 103a, light source mirror 103b, and first mirror 103c. The second running body 104 includes the second mirror 104a and the third mirror 104b. The line sensor 106 includes red, green, and blue filters as a color decomposer, and photoelectric conversion elements 106a, 106b, 106c constituting a three-line CCD sensor.

The image reading lens 105 uses the image reading lens according to Examples 1-7 of Embodiments 1-7.

In addition, the image reader can be an image reader including an image reading unit integrally having an illumination device which illuminates the original TD on the contact glass 101 in a slit form, a line sensor, a plurality of mirrors which forms an imaging optical path from the illuminated portion of the original to the line sensor, and an image reading lens disposed on the imaging optical path. The image reader is configured to read and scan the original by running the image reading unit relative to the original with a driver. Namely, the image-forming apparatus can be constituted by using the image reader according to Embodiment 9 of the present invention.

The image-forming portion 200 is located in the lower portion of the image reader 100, and includes a photoreceptor 210, charging roller 211, developing unit 213, transfer belt 214, cleaner 215, fixing unit 216, optical scanner 217, cassette 218, resist roller pair 219, signal processor 220, tray 221, and paper feeding roller 222. The transfer belt 214 includes a transfer voltage-applying roller 214a and a transfer roller 214b.

In FIG. 17, the image signals output from the three-line sensor 106 of the image reader 100 are sent to the signal processor 220 of the image-forming portion 200, and is converted into a signal for writing each color of yellow, magenta, cyan, and black in the signal processor 220.

The image-forming portion 200 includes a photosensitive photoreceptor 210 formed in a cylindrical shape as a latent image carrier. The image-forming portion 200 includes therearound a charging roller 211 as a charger, turret development station 213, transfer belt 214, and cleaner 215. A corona charger can be used instead of the charging roller 211 as a charger.

The optical scanner 217 receives signals for writing from the signal processor 220, and writes in the photoreceptor 210 by optical scanning. The optical scanner 217 optically scans the photoreceptor 210 between the charging roller 211 and the development station 213.

When forming an image, the photoconductive photoreceptor 201 rotates at a constant speed in a clockwise manner in the figure, the surface of the photoreceptor is uniformly charged by the charging roller 211, so that an electrostatic latent image is formed by receiving the exposure with the optical writing of the laser beams of the optical scanner 217. The formed electrostatic latent image is a so-called negative latent image in which an image portion is exposed.

The image writing is carried out in the order of a yellow (Y) image, magenta (M) image, cyan (C) image, and black (K) image in accordance with the rotation of the photoreceptor 210. The formed electrostatic latent image is visualized as a positive image after the reversal development with a development unit Y (development with yellow toner), a development unit M (development with magenta toner), a development unit C (development with cyan toner), and a development unit K (development with black toner) in the development station 213. Each of the obtained toner images is sequentially transferred on the transfer belt 214 by the transfer voltage-applying roller 214a, and each of the toner images is superimposed on the transfer belt 214 to be a color image.

The cassette 218 in which the transfer paper S as recording media is housed is detachably attached to the image-forming apparatus main body, and the top sheet of the housed transfer paper S is fed by the paper feeding roller 222. The leading end portion of the fed transfer paper S is captured by the resist roller pair 219.

The resist roller pair 219 feeds the transfer paper S in accordance with the movement of the color image with the toner on the transfer belt portion 214 to the transfer position. The fed transfer paper S is superimposed with the color image in the transfer portion, and the color image is electrostatically transferred by the transfer roller 214b. The transfer roller 214b adhesively transfers the color image on the transfer paper S.

The transfer paper S on which the color image is transferred is fed to the fixing unit 216, the color image is fixed in the fixing unit 216, and is discharged on the tray 221 by a not-shown paper discharge roller pair through a path with a not-shown guide. The surface of the photoreceptor 210 is cleaned by the cleaner 215 after each image transfer with each toner, so that the residual toner, paper powder or the like is eliminated.

Namely, the image-forming apparatus according to Embodiment 10 of the present invention is an image-forming apparatus including the image reader according to Embodiments 8, 9, namely, the image reader using the image reading lens according to Embodiments 1-7 as the imaging lens.

The image forming apparatus according to the present invention is not limited to the configuration which forms a color image, and can be a configuration which forms a monochrome image.

By using the image reader using the image reading lens according to the embodiments of the present invention in an in-body paper discharging image-forming apparatus in which paper is output between the image reader and the image forming portion, the image reader can be made thinner, so that the distance between the image reader and the image-forming portion can be increased. Therefore, the visibility of output paper to an operator can be improved, and operations can be simplified.

In the above description, circular lenses are used for all of the lenses. However, oval lenses in which the top and bottom of the lenses are cut can be used for the image reading lens according to the present invention, in order to reduce the size of the lens, in particular, the size of the image reader in the height direction.

According to the embodiments of the present invention, a compact imaging reading lens, which can control deterioration in performances due to a change in temperature, has a small number of lenses, and can reliably correct aberrations, can be provided.

Although the embodiments of the present invention have been described above, the present invention is not limited thereto. It should be appreciated that variations may be made in the embodiments described by persons skilled in the art without departing from the scope of the present invention.

What is claimed is:

1. An image reading lens which reads an original image, comprising:
    a front group lens system on an object side; and
    a back group lens system on an image side,
    the front group lens system including three lenses having two positive lenses and a negative lens, and the back group lens system including a plastic negative lens, wherein
the following conditional expressions are satisfied where $\Sigma dn_N/dt(N)$ is a sum of values $10^6$ times a refractive index temperature coefficient for an e-line in the negative lens of the front group lens system at 20° C. to 40° C., $\Sigma dn_P/dt(P)$ is a sum of values $10^6$ times a refractive index temperature coefficient for an e-line in the positive lens of the front group lens system at 20° C. to 40° C., fa is a focal length of the front group lens system, f is a focal length of an entire image reading lens, $d_9$ is a distance on an optical axis between the front group lens system and the back group lens system, and D is an entire length of a lens, $$0<\Sigma dn_N/dt(N)-\Sigma dn_P/dt(P)<17 \quad (1)$$

$$0.20<fa/f\times d_9/D<0.90. \quad (2)$$

2. The image reading lens according to claim 1, wherein the following conditional expression is satisfied where $d_9$ is the distance on the optical axis between the front group lens system and the back group lens system, and D is the entire length of the lens, $$0.40<d_9/D<0.70. \quad (3)$$

3. The image reading lens according to claim 1, wherein the following conditional expression is satisfied where $v_P$ is an average value of an Abbe's number for the e-line in the positive lens constituting the entire system of the image reading lens, and $v_N$ is an average value of an Abbe's number for the e-line in the negative lens constituting the entire system of the image reading lens, $$10<v_P-v_N<40. \quad (4)$$

4. The image reading lens according to claim 1, wherein a third lens arranged from the object side in the front group lens system is the positive lens having a convex surface on the image side, and a fourth lens arranged from the object side in the back group lens system is the negative lens having a concave surface on the object side.

5. The image reading lens according to claim 4, wherein the following conditional expression is satisfied where $R_9$ is a curvature radius of an image side lens surface of the third lens, and $R_{10}$ is a curvature radius of an object side lens surface of the fourth lens, $$1.0<R_9/R_{10}<2.5. \quad (5)$$

6. The image reading lens according claim 1, wherein a third lens arranged from the object side in the front group lens system is the positive lens, and the following conditional expression is satisfied where $R_8$ is a curvature radius of an object side lens surface of the third lens, and $R_9$ is a curvature radius of an image side lens surface of the third lens, $$-1.30<(R_9+R_8)/(R_9-R_8)<-0.20. \quad (6)$$

7. The image reading lens according to claim 1, wherein the following conditional expression is satisfied where fa is a focal length of the front group lens system, and fb is a focal length of the back group lens system, $$-1.3<fa/fb<-0.8. \quad (7)$$

8. The image reading lens according to claim 1, wherein at least one surface of a fourth lens constituting the back group lens system includes an aspheric surface.

9. The image reading lens according to claim 1, wherein at least one surface of first to third lenses constituting the front group lens system includes an aspheric surface.

10. The image reading lens according to claim 1, wherein an outer shape of a fourth lens constituting the back group lens system is not rotational symmetric relative to the optical axis.

11. The image reading lens according to claim 10, wherein the outer shape of the fourth lens constituting the back group lens system has a strip shape having a side in a main scanning direction longer than that in a sub-scanning direction.

12. An image reader, comprising:
an illumination system which illuminates an original;
an imaging lens which reduces and images reflection light of the original illuminated by the illumination system; and
a line sensor which photoelectrically converts an image of the original imaged by the imaging lens, wherein
the imaging lens uses an image reading lens according to claim 1.

13. An image-forming apparatus comprising the image reader according to claim 12.

* * * * *